United States Patent
Doyle et al.

(10) Patent No.: US 10,861,439 B2
(45) Date of Patent: Dec. 8, 2020

(54) MACHINE LEARNING MODEL FOR IDENTIFYING OFFENSIVE, COMPUTER-GENERATED NATURAL-LANGUAGE TEXT OR SPEECH

(71) Applicant: CA, Inc., Islandia, NY (US)

(72) Inventors: Ronald Doyle, Islandia, NY (US); Stephen Tyler, Islandia, NY (US)

(73) Assignee: CA, Inc., San Jose, CA (US)

( * ) Notice: Subject to any disclaimer, the term of this patent is extended or adjusted under 35 U.S.C. 154(b) by 89 days.

(21) Appl. No.: 16/167,063

(22) Filed: Oct. 22, 2018

(65) Prior Publication Data
US 2020/0126533 A1    Apr. 23, 2020

(51) Int. Cl.
*G10L 15/00* (2013.01)
*G10L 15/06* (2013.01)
*G10L 15/18* (2013.01)

(52) U.S. Cl.
CPC ........ *G10L 15/063* (2013.01); *G10L 15/1815* (2013.01); *G10L 2015/0631* (2013.01)

(58) Field of Classification Search
CPC .......... G06F 17/21; G06F 17/27; G06F 17/28; G06F 17/30; G06F 15/00; G06N 99/005; G06N 7/005
See application file for complete search history.

(56) References Cited

U.S. PATENT DOCUMENTS

| | | | | |
|---|---|---|---|---|
| 5,796,948 A | * | 8/1998 | Cohen ................. | G06Q 10/107 709/202 |
| 7,260,519 B2 | * | 8/2007 | Polanyi ................ | G06F 40/284 704/9 |
| 7,369,985 B2 | * | 5/2008 | Polanyi ................ | G06F 40/253 704/8 |
| 7,386,442 B2 | * | 6/2008 | Dehlinger ............. | G06F 16/35 704/10 |
| 7,853,445 B2 | * | 12/2010 | Bachenko ............. | G06F 40/279 704/9 |
| 8,868,402 B2 | * | 10/2014 | Korolev ............ | G06F 16/24578 704/1 |

(Continued)

OTHER PUBLICATIONS

Nobata, C., Tetreault, J., Thomas, A., Mehdad, Y., & Chang, Y. (Apr. 2016). Abusive language detection in online user content. In Proceedings of the 25th international conference on world wide web (pp. 145-153).*

(Continued)

*Primary Examiner* — Edgar X Guerra-Erazo
(74) *Attorney, Agent, or Firm* — Shook, Hardy & Bacon L.L.P.

(57) ABSTRACT

Provided is a process that includes: obtaining a training set of n-grams labeled as offensive; causing a machine learning model to be trained based on the training set of n-grams, wherein the machine learning model, when trained, is configured to classify natural language text as offensive or non-offensive; obtaining input natural language text expressing a computer-generated utterance; classifying after causing training, the computer-generated utterance as offensive or non-offensive using the machine learning model; and causing an output to be provided to a recipient, the output being based on whether the machine learning model classifies the computer-generated utterance as offensive or non-offensive.

20 Claims, 6 Drawing Sheets

(56) References Cited

U.S. PATENT DOCUMENTS

| | | | |
|---|---|---|---|
| 2005/0060140 A1* | 3/2005 | Maddox | G06F 40/30 704/4 |
| 2005/0097174 A1* | 5/2005 | Daniell | H04L 51/12 709/206 |
| 2007/0294077 A1* | 12/2007 | Narayanan | G06F 40/284 704/2 |
| 2008/0134282 A1* | 6/2008 | Fridman | G06Q 10/10 726/1 |
| 2008/0162540 A1* | 7/2008 | Parikh | G06F 16/9535 |
| 2009/0306969 A1* | 12/2009 | Goud | G06F 40/242 704/10 |
| 2011/0087485 A1* | 4/2011 | Maude | H04L 12/1827 704/9 |
| 2012/0158525 A1 | 6/2012 | Kae et al. | |
| 2013/0138641 A1* | 5/2013 | Korolev | G06F 16/24578 707/730 |
| 2013/0263181 A1 | 10/2013 | Impollonia et al. | |
| 2015/0110387 A1 | 4/2015 | Lienhart et al. | |
| 2015/0309987 A1 | 10/2015 | Epstein et al. | |
| 2016/0110343 A1 | 4/2016 | Kumar Rangarajan Sridhar | |
| 2017/0116178 A1 | 4/2017 | Kumar Rangarajan Sridhar | |
| 2017/0147682 A1 | 5/2017 | Alaqeeli et al. | |
| 2017/0193545 A1 | 7/2017 | Zhou et al. | |
| 2018/0089164 A1 | 3/2018 | Iida et al. | |
| 2018/0157639 A1 | 6/2018 | Rangarajan Sridhar | |
| 2019/0303796 A1* | 10/2019 | Balasubramanian | G06N 20/00 |

OTHER PUBLICATIONS

Pitsilis, G. K., Ramampiaro, H., & Langseth, H. (2018). Detecting offensive language in tweets using deep learning. arXiv preprint arXiv:1801.04433.*

U.S. Appl. No. 16/167,026, filed Oct. 22, 2018, entitled Generating Training Data From a Machine Learning Model to Identify Offensive Language.

U.S. Appl. No. 16/167,092, filed Oct. 22, 2018, entitled Real-Time Supervised Machine Learning by Models Configured to Classify Offensiveness of Computer-Generated Natural-Language Text.

* cited by examiner

MACHINE LEARNING MODEL FOR IDENTIFYING OFFENSIVE, COMPUTER-GENERATED NATURAL-LANGUAGE TEXT OR SPEECH

CROSS-REFERENCE TO RELATED APPLICATIONS

No priority claim is presented at this time.

BACKGROUND

1. Field

The present disclosure relates generally to software-development tooling and, more specifically, to a machine learning model configured to assess and influence offensiveness of computer-generated natural-language utterances.

2. Description of the Related Art

Computers generate natural language text (a term which is used generally herein to include both text and speech) in a variety of scenarios. Examples include interactive use cases, like chat bots, smart speakers, and automated email responses, in which the computer-generated text is based upon and responsive to user input. Other examples include non-interactive text generation systems, like language translation models, text summarization models, text localization models, image captioning models, and the like, in which the computer-generated text is responsive to some other type of input, like a corpus of text or an image. Traditionally, many such natural-language generation systems have been relatively of the limited in the space of possible utterances, for example, selecting output text from among a relatively small set of phrases in a template.

Newer techniques to generate natural language text have dramatically expanded the space of possible utterances a given model is capable of generating. Various contemporary machine learning techniques, coupled with appropriately tuned hardware (e.g., modern graphics processing units and machine-learning application specific integrated circuits), are often capable of generating hundreds of millions, billions, or more potential utterances, depending upon program state and inputs to which the response utterances responsive.

Developers are becoming increasingly where aware of the risk of releasing such machine learning models into production, particularly when the logic by which any given utterances produced is relatively opaque, as is the case in many contemporary machine learning models. Some of these newer models have been subject to attacks in which users submit adversarial inputs crafted to drive the natural-language generation model into a state that produces undesirable outputs. For example, Microsoft's Tay chatbot underwent such an attack and was caused to begin posting offensive tweets within hours of its release. Further, many such models may arrive at offensive output text even in the absence of an adversarial input, simply due to the model lacking appropriate cultural or temporal context for a given audience.

SUMMARY

The following is a non-exhaustive listing of some aspects of the present techniques. These and other aspects are described in the following disclosure.

Some aspects include a first process including: obtaining, with one or more processors, a training set of n-grams labeled as offensive; causing, with one or more processors, a machine learning model to be trained based on the training set of n-grams, wherein the machine learning model, when trained, is configured to classify natural language text as offensive or non-offensive; obtaining, with one or more processors, input natural language text expressing a computer-generated utterance; classifying, with one or more processors, after causing training, the computer-generated utterance as offensive or non-offensive using the machine learning model; and causing, with one or more processors, an output to be provided to a recipient, the output being based on whether the machine learning model classifies the computer-generated utterance as offensive or non-offensive.

Some aspects include a tangible, non-transitory, machine-readable medium storing instructions that when executed by a data processing apparatus cause the data processing apparatus to perform operations including the above-mentioned first process.

Some aspects include a system, including: one or more processors; and memory storing instructions that when executed by the processors cause the processors to effectuate operations of the above-mentioned first process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
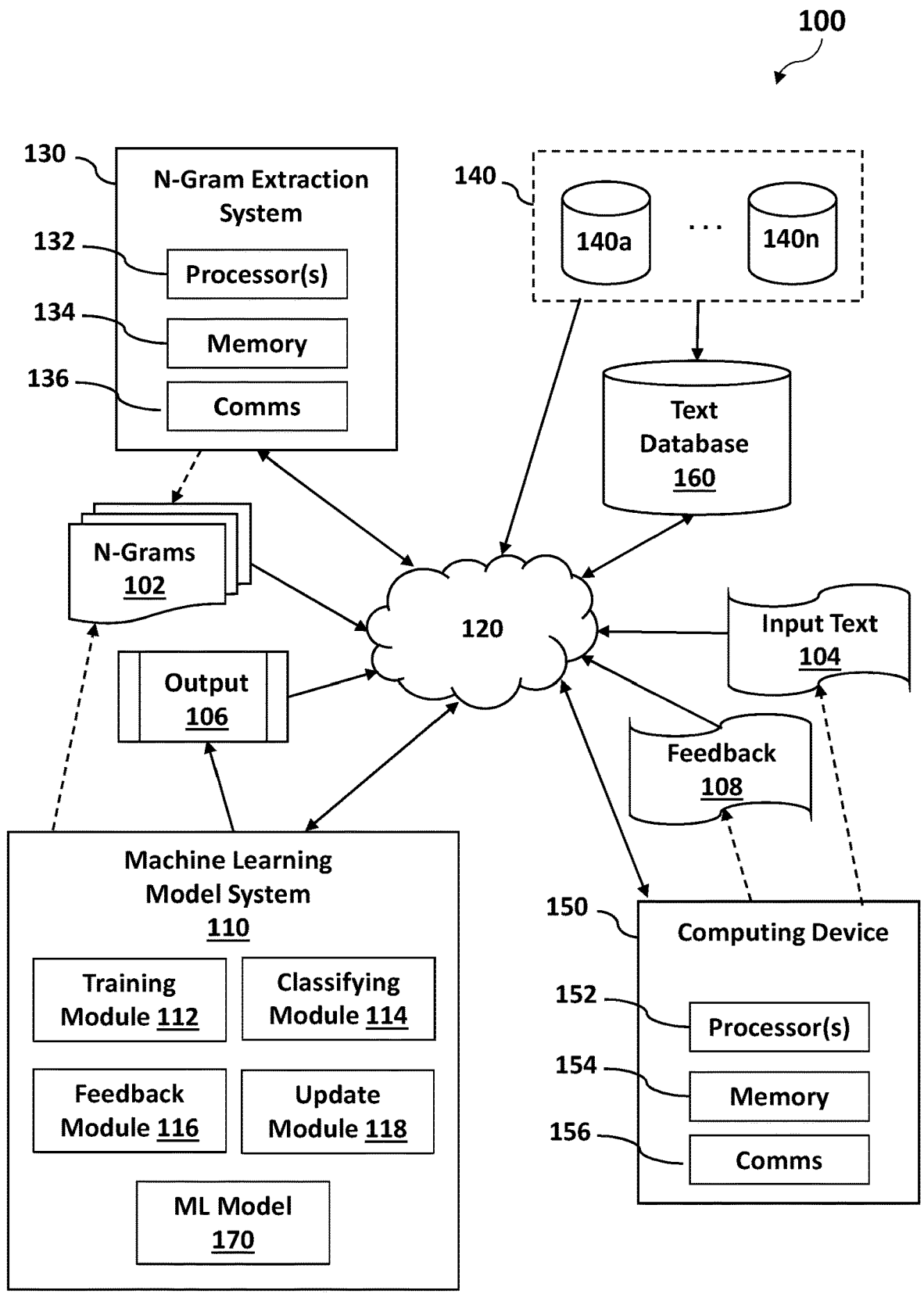
FIG. 1 is a block diagram of an exemplary computing environment including a machine learning model trainable to detect and correct offensive outputs of a natural-language generation model or influence the natural-language generation model to reduce the amount of such outputs, in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of software development tooling and natural language processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Three groups of techniques are described below under different headings in all-caps. These techniques may be used together or independently, which is not to suggest that other descriptions are limiting or that other features may not be combined.

Some embodiments mitigate some of the above-described issues and other issues with a machine learning model configured to influence the operation of a natural language generation model to reduce an amount of offensive text output by the natural language generation model relative to traditional approaches. In some embodiments, that influence is exercised by blocking offensive outputs, or some embodiments may be jointly optimized with the natural language generation model to cause the natural language generation model to be less likely to output offensive text. In some embodiments, the model that classifies text as offensive is responsive to input features of various audiences and adjusts outputs to be culturally sensitive and compliant with evolving standards over time.

In some cases, the model that classifies text as offensive is integrated into a software release pipeline. For instance, in a continuous delivery workflow whereby software is developed, tested, and subsequently deployed with relatively high speed and frequency (e.g., daily, weekly, or monthly, of more often) relative to approaches favored in the past whereby a new version might be released every few years. Recently, natural-language generation models have become part of the tools integrated into the products deployed via continues delivery techniques. However, with the case of machine learning models that generate user-facing natural-language content (e.g., text or speech (e.g., audio thereof) to be output to client devices), certain problems exist. One of the problems corresponds to the machine learning models outputting text that is, or could be, offensive to a recipient. In some embodiments, the present techniques perform various modifications or additions to the product development pipeline that may prevent, or otherwise minimize the likelihood of, offensive content from being output. In some embodiments, models by which text is classified as offensive classify text based on attributes of the audience and account for changes in audiences over time by which standards evolve.

Traditional techniques for detecting offensive text are not suitable for contemporary natural-language generation model. A naïve approach to this problem would include building a list of stop words and blocking content from being output that includes one or more of the stop words. But stop words generally cannot detect more complex offensive utterances, e.g., "your mother is a donkey" would pass most stop-word filters because it does not include any words that are offensive in the English language. Similarly, many approaches used for detecting offensive text in user-generated content are not well suited for natural-language generation model use cases. Offensive user-generated content can simply be blocked. And users are more forgiving of the presence of such content, as it is less likely to be attributed to the operator of the platform hosting the content. In contrast, natural-language generation models typically are designed to communicate some semantic state to the user to effectuate the underlying purpose of the host application. Blocking the content and remaining silent is not an option in some use cases (which is not to suggest that applications of the present technique for classifying user generated content or applications in which text is simply blocked are disclaimed). The natural-language generation model may need to be instructed to select an alternate, semantically similar utterance.

Moreover, these challenges are exacerbated by culturally-dependent heterogenous and dynamic standards for what is offensive. Using a stock list of stop words may not be practical across all difference audiences. Certain words or phrases may be offensive to one user but may not be offensive to another. For example, in certain cultures, the color yellow is offensive, whereas in other cultures the color yellow is not offensive. What constitutes offensive content often depends on the particular recipient, and a single universal list of stop words may not be useful in a large portion of use cases.

The user-cases of natural-language generation models to which the present techniques are applicable include, chatbots, automated customer support systems, automated localization systems, text translation systems, image captioning models, text summarization models, smart speakers, and systems that generate narrative summaries of sporting events, news events, weather, and the like. The types of natural-language generation models to which the present techniques are applicable include, Markov text generators, sequence to sequence models (like those with an encoder formed from a recurrent neural network having a plurality of long-short term memory model units that passes a state vector to a decoder also formed from a recurrent neural network having a plurality of long-short term memory model unit and implementing an attention function), expert systems that compose phrases with a rules engine from templates, generative neural network models, and the like. Such models may include a plurality of parameters, for instance more than 1000, more than 10,000, more than 100,000, or more than 1 million parameters that are adjusted during training and based on which the model generates natural language text. Examples include weights and biases in neural networks, transition probabilities in Markov models, criteria for selecting among templates in a rules engine, and the like.

Some embodiments test the offensiveness of machine learning algorithm's output. Testing may be performed prior to release of the natural language generation model to production or during use of the natural language generation model in production. For example, some embodiments may fuzz (e.g., by pseudo-randomly or systematically selecting (e.g., generating or choosing from extant records) values for) inputs of the natural language generation model, e.g., by applying random inputs or inputs selected based upon historical probability distributions, in some cases feeding logged inputs from past usage into the model and classifying outputs as offensive or not. Some embodiments may test a natural-language generation model with more than one million, ten million, or one billion input test cases, in some cases, testing multiple instances of the model concurrently. In some cases, the model may be tested during production by classifying candidate outputs of the natural language text generation model as offensive or not offensive.

In some embodiments, in response to detecting a model that produces offensive output, some embodiments may emit or log an alert, calculate a metric, prevent advancement of the natural-language generation model through the code release pipeline, or otherwise store record indicative of the result in memory.

In some embodiments, the natural language generation model may be optimized with an objective function that includes as a feature a classification of text as offensive or not offensive and tends to drive parameter adjustments into an envelope of the parameter space of the natural language generation model in which offensive phrases are less likely to be output.

In some embodiments, the outputs of a natural-language generation model may be checked (e.g., by one of the offensiveness-classification models described herein) to infer whether the outputs are offensive to a recipient of the outputs. As described herein, content may be offensive for a variety of reasons, e.g., if it is ethically offensive, politically offensive, racially offensive, sexually offensive, culturally offensive, geographically offensive, socially offensive, offensive based on age, religiously offensive, and the like. The term "offensive" is not used herein to refer to an absolute, platonic unchanging standard, but rather refers to a classification (or other type of score) produced by the computation acts described herein.

In some embodiments, the offensiveness-classification model may be trained on a labeled training set, or some embodiments may apply such a training set as a type of unit test for natural-language generation models. For example, data labeled beforehand (either manually or algorithmically) as offensive to an audience may be dynamically determined and used as test data to be input into a machine learning model in both development and production. The offensiveness-classification model may be trained using the classified offensive input data to learn what constitutes offensive content. Content output from the machine learning model may be monitored during the test portion to detect offensive outputs from the machine learning model, which in turn may be fed back to the machine learning model as offensive input data. By doing so, the above-referenced techniques may provide an improved offensive test capability for an integrated or upstream natural-language generation model.

Training sets may be obtained from a variety of sources. Some embodiments may obtain streams of content (e.g., social media feeds) as an input to identify current topics, keywords, or phrases that are determined to be sensitive. In some cases, the labels are applied manually, or some embodiments may infer the labels based on metadata and context, e.g. responses to posts. This information may be used to train the offensiveness-classification model. Targeting the appropriate content stream and source (e.g., social media platforms and channels) that are relevant to the machine learning model, observed sentiment analysis input from such streams and sources may be leveraged to dynamically add to a set of data deemed offensive. This data may then be used as an input for the machine learning model to be trained to classify inputs as offensive or non-offensive.

Different content streams and sources may be targeted to different audiences based on geography, political affiliation, age, and the like, and these features may be further be used as inputs to the machine learning model to identify what different audience perceive as offensive.

The offensiveness-classification model may further be tested and improved for identification of offensive input classifications by monitoring outputs of the natural-language generation model and feedback to the outputs. This may allow the machine learning model to dynamically learn and adapt its own data model, improving the overall effectiveness of the model. Furthermore, the machine learning model's (e.g., the combination of the offensiveness-classification model and the natural-language generation model) output may be used to create additional data for testing. For instance, sentiment analysis of reactions to outputs from the machine learning model may be performed. In some embodiments, this may correspond to a supervised learning/training feature (e.g., through tagging). Furthermore, negative reactions to outputs from the machine learning model may be used to re-trigger learning/training for the machine learning model by providing the machine learning model with improved data.

In some embodiments, the training of the machine learning model may begin by obtaining a training set of n-grams. The training set of n-grams may include one or more n-grams, each having been labeled as offensive (and some embodiments may also obtain n-grams labeled as non-offensive). The n-grams may be of various lengths (e.g., n=1, n=2, n=15, or longer etc.). For example, the n-grams may correspond to a single word, a series of words, a sentence, a plurality of sentences, a paragraph, or a document including multiple paragraphs, with n-indicating the number of sequential tokens.

The one or more n-grams may be determined based on a plurality of n-grams received from a corpus of unstructured natural language text. For example, the corpus may include one or more documents (e.g., content from a hyperlink), one or more strings of text from a social media network (e.g., posts, comments, responses, etc.), one or more communication messages (e.g., emails, SMS messages, text messages), and the like. For each n-gram, an offensiveness score may be generated, where the offensiveness score may indicate a likelihood that the n-gram, when viewed by one or more recipients, would produce a negative reaction. In some embodiments, the offensiveness score may be a numerical value (e.g., a number from 0 to 100, a number from 0.0 to 1.0), a binary value (e.g., 0 or 1). Depending on the particular offensiveness score computed for each particular n-gram, one or more n-grams from the plurality of n-grams may be selected based on satisfaction of certain offensiveness score criteria. In one example embodiment, the one or more n-grams that are selected may have an offensiveness score that exceeds a threshold offensiveness score indicative of a negative audience reaction. For example, the offensiveness score threshold may be 50, and so if a particular n-gram's generated offensiveness score is 30, then this n-gram may be classified as non-offensive, whereas another n-gram, having an offensiveness score of 70, may be classified as offensive.

In some embodiments, the one or more n-grams may be classified as being offensive based on features associated with that/those n-grams. For instance, each n-gram may have a plurality of offensiveness scores generated and formed into a vector organized based on the features associated with that n-gram. The features, for example, may relate to profile information of a creator of (or entity responding to) the n-gram (e.g., demographic information), temporal information related to when the n-gram was created (e.g., a timestamp), or any other suitable feature criteria. The offensiveness vector may therefore include as many dimensions as there are features, whereby depending on the particular features, a different offensiveness score may be generated and stored within the vector.

In some embodiments, each n-gram may have associated therewith a plurality of labels, each label corresponding to a different demographic profile or other set of demographic attributes. In some embodiments, each label may indicate whether the corresponding n-gram is designated as offensive for training purposes to those in an audience including the demographic attributes. In some embodiments, each n-gram may be associated with a plurality of such attributes, and each attribute may include a correlation of the attribute with a determination that the corresponding n-gram is offensive to those having the attribute, for instance, a value from 0 to 1. In some embodiments, labels may be determined from social media feeds and other data sources that evolve over time based upon responses of various users to n-grams posted by other users. In some embodiments, n-grams may be classified as offensive based upon sentiment analysis of responsive entries and classifications may be associated with demographic attributes of those supplying the responsive entries. Responsive entries may include text analyzed with sentiment analysis, rankings, votes, favoriting, and the like.

In some embodiments, the one or more n-grams may be provided to a machine learning model (e.g., the offensiveness-classification model, the natural-language generation model, or a combination thereof) to cause the machine learning model to be trained, where the machine learning model, when trained, may be configured to classify inputs (e.g., input text) as offensive or non-offensive or generate text that is less likely to be offensive than those using traditional techniques. For example, the machine learning model may be trained based on the one or more n-grams. In some embodiments, the machine learning model may be a supervised machine learning model or an unsupervised machine learning model. A supervised machine learning model may employ labeled training data to develop an inferred function that maps an input to an output. An unsupervised machine learning mode may employ unlabeled training data to learn relationships between elements of the training data to classify input data. Other forms of learning are also possible such as, and without limitation, semi-supervised learning, active learning, and reinforcement learning. Additionally, there are various different types of machine learning algorithms that may be employed herein, the particulars of which may be dependent on the use case. For example, the machine learning model described herein may correspond to a decision tree model, an artificial neural network ("ANN") model or neural network model, clustering learning model, Bayesian learning model, or a rule-based machine learning model.

After the machine learning model has been caused to be trained, input text may be obtained. The input text, in one embodiment, may represent (e.g., be) a computer-generated utterance. In some cases, the input text is received with demographic features of an audience for which the computer generate utterance was generated by a natural-language generation model. The computer-generated utterance may correspond to an utterance produced by a particular output facing content system. For example, the computer-generated utterance may correspond to an utterance produced by a chatbot capable of interacting with a user to provide textual responses to input text from a user. In order to make sure that the response to be output by the chatbot is non-offensive, the machine learning model may be used to analyze a computer-generated utterance responding to the input to determine whether the computer-generated utterance is classified as offensive or non-offensive. Some embodiments may classify intermediate representations in non-natural languages as offensive.

In some embodiments, the machine learning model may be used to classify the computer-generated utterance as offensive or non-offensive, in some cases based in part on the input features of the audience. To classify the computer-generated utterance, the machine learning model may be configured to generate an offensiveness score (e.g., a binary classification or a value in some ordinal or cardinal range) for the computer-generated utterance. The offensiveness score may indicate a likelihood that an audience reaction to the computer-generated utterance will be negative. The offensiveness score may then be compared with an offensiveness score threshold such that, if the offensiveness score is determined to exceed the offensiveness score threshold, then the computer-generated utterance is classified as offensive, and if the offensiveness score is determined to be less than or equal to the offensiveness score threshold, the computer-generated utterance is classified as non-offensive. In some embodiments, the offensiveness score determined during classification of the computer-generated utterance and the offensiveness score threshold may be similar to that of the offensiveness score and offensiveness score threshold described above with reference to determining n-grams that are offensive.

Based on whether the machine learning model classifies the computer-generated utterance as offensive or non-offensive, an output may be caused to be provided. For example, if the computer-generated utterance is classified as being non-offensive, then the computer-generated utterance may be provided as an output to one or more intended recipients. As another example, if the computer-generated utterance is classified as being offensive, then another computer-generated utterance may be selected, and if an offensiveness score of that utterance is determined to be less than or equal to the offensiveness score threshold, then that utterance may be output. In some embodiments, the selected utterance may correspond to an utterance that is determined to be semantically related to the computer-generated utterance. As an alternative, if the computer-generated utterance is classified as offensive, then the output may be to prevent the computer-generated utterance from being provided, and an intended recipient may not receive any content as a response.

FIG. 1 is a diagram of an example of a computing environment including a machine learning model trainable to detect and correct offensive outputs, in accordance with some embodiments of the present techniques. In the illustrative embodiment, computing environment 100 may include, amongst other components, a machine learning model system 110, a computing device 150, an n-gram extraction system 130, a text database 160, and one or more natural language text sources 140. Each of machine learning model system 110, computing device 150, n-gram extraction system 130, text database 160, and natural language text sources 140 may be configured to communicated with one another or with any other device, system, component, via one or more networks 120.

Networks 120 may include a single network or a combination of different networks. For example, networks 120 may include the public network (e.g., the Internet), local area networks ("LAN"), wide area networks ("WAN"), a private network, a proprietary network, an intranet, a virtual network, or any combination thereof. In some embodiments, various security mechanisms may be implemented to secure communications across networks 120. For example, a transport security layer ("TLS") or Secure Sockets Layer ("SSL") protocols may be employed. In some embodiments, such as with reference to a data center, networks 120 may include an in-band network through which data operated upon by an application is exchanged or an out-of-band network through which infrastructure monitoring data is exchanged.

Text database 160 may be populated with various instances of natural language text from text sources 140. In some embodiments, text sources may include a plurality of text sources 140a-140n. For example, one text source 140 may include unstructured natural language texts, such as social media posts, comments to social media posts, comments to articles, comments/captions associated with images, and the like. As another example, one text source 140 may include structured natural language texts, such as structured documents (e.g., news articles, stories, etc.). Text sources 140 may be updated periodically, such as every few seconds, minutes, days, etc. Additionally or alternatively, text sources 140 may be populated upon an input from a user, a system administrator, or in response to a particular event, such as a major news event. Text sources 140 may obtain data by various web crawling techniques or via inputs from users. In some embodiments, text sources 140 may include data obtained via one or more third party companies. For instance, a third-party company may collect and curate texts or documents to be used for analyzing offensiveness therewith. Text database 160 may obtain a corpus of unstructured natural language text from text sources 140. The corpus may include unstructured natural language text statements, as well as corresponding responses to the unstructured natural language text statements by one or more responding users. For example, if the unstructured natural language text statement corresponds to a social media post, then the corresponding responses may be a response to that post. The corresponding responses to the unstructured natural language text statements may also be responsive natural language text statements, or may be responding user-expressed scores (e.g., a "like" or other emotion expressed, a numerical value attributed to a favorability of the unstructured natural language text statement, and the like).

In some embodiments, a training set of n-grams labeled as offensive may be obtained otherwise formed from the corpus of unstructured natural language text, which may include a plurality of n-grams. The training set of n-grams may include any value or values, such as n=1, 2, . . . , m. For instance, each n-gram may correspond to one of: a word (e.g., n=1), a series of words (e.g., n>1), a phrase, a sentence, or a plurality of sentences. The training set may be formed, in one some embodiments, by labeling the unstructured natural language statements, and accordingly the n-grams included therein, based on an offensiveness score of the unstructured natural language text statements. Additionally or alternatively, the offensiveness score may be associated with each corresponding response to any particular natural language text statement. Features (e.g., demographic features) associated with users that provided the responses may then be associated with the corresponding labels.

In some embodiments, the n-grams may be natural language tokens or intermediate representations of a natural language processing model. Furthermore, the n-grams included within the training set may be arranged in a structured or unstructured format. Each of label may be mapped one-to-one with an n-gram, or alternatively, one label may be applied to a plurality of n-grams (e.g., label of "offensive"). Still further, some n-grams may have multiple labels depending on a particular audience that will view, or has viewed, the n-gram (e.g., certain n-grams may be labeled as offensive to one age demographic while the same n-grams may be labeled as non-offensive to a different age demographic).

In some embodiments, n-gram extraction system 130 may include one or more processors 132, memory 134, and a communications component 136. Each processor 132 may be capable of executing one or more computer program instructions stored within memory 134. For instance, the computer program instructions may facilitate execution of a process for obtaining a training set of n-grams labeled as offensive from a corpus of unstructured natural language text. Furthermore, communications component 136 may be configured to facilitate the retrieval or transmission of data via various different communications protocols or across networks 120. Additionally, although n-gram extraction system 130 is shown to include processors 132, memory 134, and communications component 136, additional components may also be included, and certain components may be omitted without deviating from the scope of the present teaching.

In some embodiments, n-gram extraction system 130 may be configured to obtain, or otherwise cause to be obtained, the corpus of unstructured natural language text including a plurality of n-grams. At least some of the n-grams may be labeled as offensive, and these n-grams 102 may be used to form a training set of n-grams 102 to be used by machine learning model system 110 to generate training data for a machine learning model, as described herein. In some embodiments, n-grams 102 may be stored within memory 134 of n-gram extraction unit 130. In some embodiments, the corpus may be stored within text database 160. After the corpus of unstructured natural language text including plurality of n-grams 102 is obtained, n-grams 102 (in addition to the corpus of natural language text) may be provided to machine learning model system 110 across networks 120.

N-gram extraction system 130 may analyze data from each of text sources 140 across networks 120 to determine a plurality text strings included therein. For example, the text strings may include unstructured natural language text statements. Based on the analysis, n-gram extraction system 130 may be configured to obtain, or otherwise cause, a plurality of text-strings to be provided and stored within text database 160. In some embodiments, each text string obtained may include one or more sub-threads of text corresponding to a response to that particular text string. For instance, each unstructured natural language text statement may include one or more corresponding responses to that/those statements provided by a responding user. The responses may, additionally, be responsive natural language text statements or expressed scores from the corresponding responding users. As an illustrative example, a text string may correspond to a social media post, and each sub-thread of text may correspond to a response to that social media post. As yet another example, the sub-threads of text may represent metadata associated with each text string, such as likes or other metadata indicative of a reaction to the text string. Each text string may include an associated identifier indicating an entity that the string originated from (e.g., a user name, user profile), demographic features associated with a corresponding responding user (e.g., profile information), features associated with that text string (e.g., linguistic properties, a timestamp associated with the text string's origin), and source information indicating a particular source 140 that the text string was obtained from. In some embodiments, each sub-thread of text may also include metadata indicating the text string that the sub-thread corresponds to, as well as the identifier information and features associated with the sub-thread of text. The information associated with the sub-thread may be substantially similar to the text string, in one embodiment.

In some embodiments, the corresponding responses to the unstructured natural language text statements may be scored based on whether the corresponding responses indicate offense to the unstructured natural language text statements. The scoring may produce offensiveness scores for each unstructured natural language text or corresponding response thereto. A training set of n-grams (e.g., n-grams 102) may be formed based, at least in part, by labeling the unstructured natural language text statements from the corpus, as well as or alternatively the n-grams included within the natural language text statements, based on the offensiveness scores associated with each unstructured natural language text statement's corresponding responses. The labels may then be associated with the demographic features of the users providing the responses. The training set of n-grams may then be employed by machine learning model system 110 to train a machine learning model such that the machine learning model is configured to classify natural language utterances as offensive or non-offensive, or to generate utterances to be trained based on the training set.

In some embodiments, machine learning model system 110 may include a training module 112, a classifying module 114, a feedback module 116, and an update module 118. Each module may have a different function and may work in conjunction with one or more other modules. Furthermore, each of modules 112-118 may be employed at different aspects of the deployment pipeline when being used to train, test, and refine the machine learning model used to recognize offensive utterances.

In some embodiments, training module 112 may be configured to receive the corpus of unstructured natural language text statements and corresponding response to the natural language text statements provided by one or more responding users from n-gram extraction system 130. Alternatively, training module 112 may receive the corpus of unstructured natural language text statements and responses from text database 160 in response to n-gram extraction system 130 instructing that the corpus be provided to machine learning module 110. In the latter scenario, n-gram extraction system 130 may be configured to perform at least part of the training set formation steps. In some embodiments, the responses provided by the one or more users may be responsive natural language text or user expressed scores, as mentioned above.

Training module 110 may be configured to obtain one or more demographic features associated with the responding users. For example, the demographic features may correspond to information about where a particular user is located (e.g., geographic information), an age of the user, an ethnicity of the user, a political affiliation of the user, socioeconomic information regarding the user, or interests of the user (e.g., musical interests, social interests, hobbies, etc.), and the like. Furthermore, in some embodiments, one or more features associated with each n-gram included within the corpus. For example, the features associated with an n-gram may include linguistic information (e.g., a language with which the responsive natural language text statements are formed), temporal information (e.g., a timestamp for when the responses were provided, a timestamp indicating when a particular piece of unstructured text was created (e.g., posted to a social media website, sent via an email or message, etc.). The temporal information may be employed to indicate a "freshness" of a particular piece of text. For example, texts that have a timestamp indicating a creation time that is greater than a certain temporal threshold (e.g., a few hours, a few days, a few months, a few years) may be weighted less heavily than more recently created texts.

In some embodiments, each feature may be grouped into a multi-dimensional vector. The dimensionality of the feature vector may be based on a number of features to be used or a number of features available for classification. Each dimension of the feature vector may also include a bias or weight to influence the effect of a particular dimension's feature on classification of the text. For example, older texts may be weighted less than more recent texts so as to apply a greater emphasis on texts that are newer and therefore more indicative of current offensive topics, phrases, or words. In some embodiments, the features associated with each text may be stored, upon extraction by training module 112, within memory of machine learning model 110 or text database 160. For example, text database 160 may be organized as a relational database where each feature represents a column, and each row represents an n-gram. In this particular example, each relational database may be associated with a different text.

In some embodiments, training module 112 may be further configured to score the corresponding responses to the unstructured natural language text statements of the corpus. The scoring may be based on whether the responses indicate offense to the unstructured natural language text statements. In other words, the responses may be analyzed to determine whether a corresponding user that provided the corresponding response viewed the unstructured natural language text statement as offensive. The scoring may yield offensiveness scores for each response indicative of how offensive a particular text was deemed to be for a particular user having a particular set of demographic features.

Based on the offensiveness scores, a training set of n-grams (e.g., n-grams 102) may be formed. In some embodiments, the training set may be formed by labeling the unstructured natural language text statements, or the n-grams included therein, based on the offensiveness scores determined for the corresponding responses to the text. The labels (e.g., offensive or non-offensive) may then be associated with the demographic features of the corresponding user that provided the response. Thus, the training set of n-grams (e.g., n-grams 102) may be produced and provided to a machine learning model system 110 to train a machine learning model to classify input natural language utterances as offensive or non-offensive, or generate utterances to be trained based on the training set.

Classifying module 114 may be configured to classify each n-gram of the unstructured natural language text statements or responses thereto as either offensive or non-offensive. For instance, training module 112 may call on classifying module 114 to classify text as offensive (or non-offensive) for generation of the training set. Classifying module 114 may be configured to generate classification information indicating whether each n-gram from the training set was classified as offensive or non-offensive. In some embodiments, the one or more n-grams may be classified as offensive based on the one or more features associated each n-gram that were previously extracted. To classify each n-gram, an offensiveness score may be generated. In some embodiments, a plurality of offensiveness scores may be generated for each n-gram, where each offensiveness score is related to one or more of the features. An offensiveness vector may therefore be generated including as many dimensions as there are features. In one embodiment, the classification information may include the offensiveness vector.

The offensiveness score may be determined based on various properties associated with a particular n-gram. In some embodiments, for each piece of unstructured natural language text obtained, a plurality of text strings included therein may be obtained. As an illustrative example, if the unstructured natural language text includes social media posts, then each text string may correspond to one of the social media posts. One or more n-grams included within each text string may be extracted. Furthermore, one or more sub-threads of text for each text string may be determined. Continuing the above-mentioned example, each sub-thread of text may correspond to a response to that particular social media post. After determining the one or more sub-threads of text, one or more n-grams included within each sub-thread of text may be determined. In one embodiment, classifying module 114 may determine an offensiveness score for a particular text string based on the one or more n-grams included within each sub-thread. For example, based on a number of n-grams included within a particular text string's sub-threads, an offensiveness score may be computed. For instance, a great number of n-grams, a greater number of n-grams with n>1, or a word of each n-gram may influence the offensiveness score. As an illustrative example, sub-threads including a large number of n-grams with n>1 may indicate expressive feedback to a particular text string, indicating negative sentiment to that text string. As another illustrative example, the greater the number of n-grams associated with a particular text string's sub-threads may indicate an increased likelihood that the text string is viewed as being offensive. In still yet another example, temporal information associated with each n-gram of a sub-thread in relation to temporal information associated with those sub-thread's corresponding text string may indicate whether the text string is offensive or not. For instance, for each sub-thread, an amount of time between a timestamp of when the text string was generated and a timestamp of when the corresponding sub-thread was generated may be determined. Based on the amount of time, the offensiveness score for a particular text string may be determined. For example, an offensive social media post may receive a large number of responses contradicting or reacting to post in a relatively small amount of time. Therefore, the more comments received in the smaller amount of time may serve as an indicator for the offensiveness score when being generated.

In some embodiments, training module 112 may further be configured to cause a machine learning model 170 to be trained based on the training set of n-grams 102 labeled as offensive that were previously obtained. In response to machine learning model 170 being trained, machine learning model 170 may be configured to classify natural language text input to the machine learning model as offensive or non-offensive. For instance, based on whether the classification information indicates that a particular n-gram is classified as being offensive for one or more features, input data representing that/those offensive n-grams and the corresponding features may be generated.

Training module 112 or classifying module 114 may be configured, in some embodiments, to determine one or more semantically related n-grams for each n-gram classified as being offensive. For example, training module 112 or classifying module 114 may analyze each n-gram to determine a word or words included therein, as well as a context of those words, and identify one or more additional words that are semantically related to the n-gram's words. In some embodiments, semantically related words or phrases may be identified using various natural language processes such as Latent Semantic Analysis ("LSA") or Word2Vec. Additionally techniques for identifying topically or otherwise semantically related terms or phrases include Latent Dirichlet Allocation ("LDA"), Spatial Latent Dirichlet Allocation ("SLDA"), independent component analysis, probabilistic latent semantic indexing, non-negative matrix factorization, and Gamma-Poisson distribution.

Some embodiments may extract or otherwise infer a relationship of an expected usage of words within a document based on context. Some embodiments map words and documents to a "concept space," and find related words or documents within that same content space. Some embodiments may apply a "bag of words" approach, whereby the ordering of the words is not relevant, but the frequency with which those words appear within the document is relevant. Concepts are represented as patterns of words that are typically found to appear together within a document.

To perform such an analysis, a matrix representation of the corpus may be generated. In the matrix, each row may include a unique word (or n-gram with more than one word) from the texts, and a corresponding text or texts with which that word appears. Each cell of the matrix may indicate a number of instances that the particular word (or n-gram) appeared within that document (or a term-frequency inverse document frequency score). For example, if a first unstructured natural language text included the sentences—"The sky is blue. Blue is a beautiful color."—then the matrix may include a row for the words "sky," "blue," and "color," with corresponding cell values (1, 2, 1), respectively, indicating that the word "sky" occurred once within the text, the word "blue" occurred twice, and the word "color" appeared once. In some embodiments, after the matrix is generated, weights may be applied so that certain words, such as those that generally appear infrequently in text, are weighted more heavily. For example, a word that only appears in 10% of the texts of the corpus may be weighted more heavily that a word that appears in 95% of the texts of the corpus. One exemplary weighting scheme corresponds to the term frequency-inverse document frequency ("TFIDF") weighting scheme. The TFIDF weighting may be applied to each cell in the matrix using Equation 1:

$$\text{TFIDF}_{ij} = (N_{ij}/N_j) \times \log(D/D_i) \quad \text{Equation 1.}$$

In Equation 1, $N_{ij}$ corresponds to a number of time that the i-th word appears in the j-th document; $N_j$ corresponds to a total number of words in the j-th document; D corresponds to the number of documents (e.g., number of columns in the matrix); and $D_i$ corresponds to the number of documents in which the i-th word appears. By using Equation 1, a document having a large number of instances of a particular word being present, and words that only appear in a few of the documents in the corpus, may be emphasized.

After the matrix is created, with or without application of TFIDF, the matrix may be analyzed using Single Value Decomposition ("SVD") to find a reduced dimensional representation of the matrix. In the reduced dimensional representation, the strongest relationships between words and documents are kept, while the weakest (e.g., noise) are removed. The SVD decomposition of the initial matrix may involve the matrix product of three matrices: (1) a term document matrix, (2) a singular value (diagonal) matrix, and (3) an SVD document matrix. The single value matrix may be further reduced by "zero"-ing out all by the top n-values (e.g., n=2), so as to be left with a diagonal matrix including only two values, where the remaining values of the matrix equal zero. From this, a low-rank approximation of the original matrix may be computed using the reduced value diagonal matrix. Continuing the previous example, for n=2, a 2-dimensional graph of the various documents may be produced where each document's vector is plotted within the 2-dimensional graph space. By applying SVD, some embodiments identify (e.g., detect) terms within documents that, based on the original matrix would appear to be unrelated, but from the reconstructed matrix actually are related. Therefore, words that are similar to other words may be identified by some embodiments by finding terms whose row vector dot product is positive.

Some embodiments may compare computer-generated utterances to n-grams labeled as offensiveness with SVD (or other distance metric). A computer-generated utterance that is related by the preceding measure (e.g., within a threshold) to an offensive n-gram in a training set may be, in response, determined to be an offensive computer-generated utterance.

As another illustrative example, some embodiments may quantify similarity between known offensive n-grams and a computer-generated utterance with Word2Vec, which corresponds to a technique for generating word embedding using two neural networks trained to reconstruct linguistic contexts of words. Word2Vec employs one or more models—(1) continuous bag-of-words ("CBOW") (e.g., using surrounding text context to predict a word), (2) continuous skip-gram (e.g., using a current word to predict surrounding context)— to generate a distributed representation of words.

Some embodiments may use a corpus of text, such as the corpus of unstructured natural language text, as an input and may output a set of feature vectors for the words in the corpus. By doing so, some embodiments may map feature vectors into a vector space, thereby enabling similar words to be identified based on grouping of the feature vectors (e.g., via determining there is less than a threshold cosine distance, sine distance, Manhattan distance, Makowski distance, Euclidian distance, or the like, between vectors corresponding to known-offensive n-grams and unknown computer-generated utterances).

Some embodiments may cluster the corpus by topic with LDA and classify the topic clusters as offensive or non-offensive based on topic scores of n-grams labeled as such. Some embodiments may then compute LDA topic scores for computer-generated utterances and classify those utterances having greater than a threshold topic score for offensive topics as offensive. Or this and the other scores may be combined with an ensemble model, for instance in a weighted combination that produces a score that is compared to a threshold to classify utterances as offensive for a given audience.

Classifying module 114, in some embodiments, may be further configured to cause a machine learning model to be trained such that the machine learning model can classify input utterances as offensive or non-offensive based on training provided. Classifying module 114 may obtain a training set of n-grams labeled as offensive from training module 112 or from text database 160.

In some embodiments, features associated with each n-gram may also be obtained with the training set of n-grams. For example, at least some of the n-grams from the training set may have a plurality of labels, where the labels may indicate, amongst other characteristics, demographic attributes of a population for which that particular n-gram has been designated as offensive. For instance, at least some of the n-grams may be labeled as offensive for some populations, but for other populations, these n-grams may not be labeled as offensive. In an illustrative example, one or more of the n-grams within training set of n-grams 102 may include five or more words (e.g., n≥5). Furthermore, as mentioned above, each n-gram 102 may include natural language text obtained from a corpus of unstructured natural language text documents, such as the corpus described above.

Classifying module 114 may be configured to cause machine learning model 170 to be trained based on training set of n-grams 102. When machine learning model 170 is trained, machine learning model 170 may be configured to classify natural language text as offensive or non-offensive. In some embodiments, machine learning model 170 being trained corresponds to machine learning model being trained based on a first sub-set of training set of n-grams 102, and cross-validating machine learning model 170, when trained, based on a second sub-set of training set of n-grams 102. The second sub-set of training set of n-grams 102 may include one or more n-grams that at least partially differ from that of the first sub-set of training set of n-grams 102.

In some embodiments, machine learning model system 110 may obtain input natural language text expressing a computer-generated utterance. In particular, classifying module 114 may obtain the input natural language text. In some embodiments, the input natural language text may be obtained from client device 150 in the form of input text 104. For example, client device 150 may be configured to generate utterances using an utterance generation engine. For example, the utterance generation engine may include one or more of a chatbot, a machine translation system, a text summarization model, or a speech-to-text ("STT") processing system. In some embodiments, one or more computer program instructions for generating utterances using the utterance generation engine may be stored within memory 154 of client device 150. The computer program instructions may be executed by one or more processors 152 of client device 150, which in turn may cause input text 104 expressing the computer-generated utterance to be produced. Alternatively (or additionally), the utterance generation engine may be located on a separate computing system, and the aforementioned is merely exemplary. In this scenario, the computer-generated utterance may be produced responsive to an input from a user-facing device, such as client device 150. For example, a user operating client device 150 may provide an input text item (e.g., input text to a chatbot), and client device 150 may communicate the input text item to the utterance generation engine via communications component 156. The utterance generation engine, in turn, may generate and output natural language text expressing the computer-generated utterance, which prior to being provided to client device 150, may be provided to machine learning model 170. In some embodiments, processors 152, memory 154, and communications component 156 may be substantially similar to processors 132, memory 134, and communications component 136, and the previous descriptions may apply.

Classifying module 114 may provide the input natural language text to machine learning model 170 after machine learning model 170 has been trained. Classifying module 114 may then be configured to, using machine learning model 170, classify the computer-generated utterance as offensive or non-offensive. In some embodiments, classifying module 114 may determine an offensiveness score for the computer-generated utterance. The offensiveness score may indicate a likelihood that an audience reaction to the computer-generated utterance will be negative or illicit a negative response. Here, the audience reaction may correspond to one or more users associated with one or more features, such as users of a particular demographic. Classifying module 114 may further determine whether the offensiveness score for the computer-generated utterance satisfies an offensiveness score threshold criterion. If the offensiveness score threshold criterion is satisfied, then classifying module 114 may determine that machine learning model 170 classified the computer-generated utterance as offensive. However, if the offensiveness score threshold criterion is not satisfied, then classifying module 114 may determine that machine learning model 170 classified the computer-generated utterance as non-offensive. In some embodiments, the classification of the computer-generated utterance as offensive or non-offensive may be based on one or more features associated with an intended recipient of an output from machine learning model 170.

Classifying module 114 may further be configured to cause an output 106 to be provided to a recipient. For example, the recipient may correspond to a user operating client device 150. The specifics of what output 106 encompasses may be based on whether machine learning model 170 classified the computer-generated utterance as offensive or non-offensive. For example, if the computer-generated utterance was classified as non-offensive, then output 106 may include the computer-generated utterance, which may be provided to the recipient (e.g., client device 150). As another example, if the computer-generated utterance was classified as offensive, output 106 may include a different computer-generated utterance that is selected or generated. For instance, the different computer-generated utterance may be determined to be semantically similar (with one of the above-described distance metrics) to the computer-generated utterance. In some embodiments, in response to determining that machine learning model 170 classified the computer-generated utterance as offensive, classifying module 114 may be configured to generate a plurality of computer-generated utterances that are each determined to be semantically similar to the computer-generated utterance of the input text. A ranking of the plurality of computer-generated utterances may be determined based on a semantic similarity to the computer-generated utterance, and a selection of a highest-ranking computer-generated utterance from the plurality of computer-generated utterances may be made, where the selected computer-generated utterance is also not classified as offensive by machine learning model 170.

Machine learning model system 110 further includes feedback module 116 and update module 118, as mentioned above. Feedback module 116 may be configured to enable feedback to be provided with regard to outputs of machine learning model 170 in order to determine how well machine learning model 170 classifies inputs. Update module 118 may be configured to cause parameters of machine learning model 170 to be updated based on feedback obtained by feedback module 116.

In some embodiments, a computer-generated utterance classified by machine learning model 170 as non-offensive may be received by feedback module 116. As mentioned previously, training module 112 and classifying module 114 may be used to train machine learning model 170 such that machine learning model 170 is configured to classify input text (e.g., input text 104) as offensive or non-offensive. The computer-generated utterance may, in one embodiment, correspond to an utterance generated by an utterance generation engine. For example, the computer-generated utterance may be based on an output of a chatbot, a machine translation process, or a natural language processing abstractive text summarization process.

In some embodiments, feedback module 116 may be configured to obtain feedback 108 regarding the computer-generated utterance. For example, feedback 108 may be obtained from client device 150 responsive to the computer-generated utterance be provided thereto. Feedback 108 may be indicative of an audience reaction to the computer-generated utterance. For example, negative feedback may indicate that the computer-generated utterance was poorly received by the audience, and therefore the computer-generated utterance may have been offensive. In some embodiments, the feedback may be associated with one or more audience features among one or more different demographics (e.g., demographic attributes) of various audience populations. Furthermore, the feedback may include unstructured natural language text from the audience following the audience receiving the computer-generated utterance. For example, subsequent to receiving the computer-generated utterance, feedback module 116 may be configured to generate and output an interface to be provided to the recipient of the computer-generated utterance. In this particular scenario, the interface may allow the recipient to provide feedback in the form of text responses regarding the recipient's reaction to the utterance. Alternatively or additionally, the interface may include a rating mechanism that allows the recipient to provide a rating for how offensive, non-offensive, or acceptable the computer-generated utterance. Data representing the feedback may then be returned to feedback module 116 from the corresponding recipient's client device 150 via networks 120.

Feedback module 116 may be further configured to determine, based on feedback 108, whether the computer-generated utterance is/was perceived as offensive by the audience. In some embodiments, where feedback 108 includes unstructured natural language text, the determination of whether the computer-generated utterance was perceived as offensive includes classifying the unstructured natural language text with a natural language processing sentiment analysis model (e.g., via LSA, LDA, Word2Vec). In some embodiments, whether the computer-generated utterance is perceived as offensive may include determining a feedback score. For instance, feedback module 116 may be configured to determine or generate a feedback score for feedback 108, where the feedback score indicates how offensive the audience reaction perceived to be to the computer-generated utterance. Feedback module 116 may further be configured to determine whether the feedback score of feedback 108 satisfies a threshold criterion. For example, if the feedback score is a numerical value that exceeds a threshold feedback score value, then feedback 108 may indicate that the computer-generated utterance was perceived as offensive. As another example, if the feedback score numerical value is less than or equal to the threshold feedback score value, then feedback 108 may indicate that the computer-generated utterance was perceived as non-offensive.

Update module 118 may be configured to cause one or more parameters of machine learning model 170 to be updated based on the computer-generated utterance and a result of the determination of whether the computer-generated utterance is/was perceived as offensive by the audience. In some embodiments, causing the one or more parameters to be updated may include adjusting at least some of the one or more parameters in a direction that causes a misclassification rate of machine learning model 170 to be reduced. For instance, the parameters may be adjusted so that the misclassification rate of machine learning model 170 is reduced based on a training set including the computer-generated utterance and the offensiveness determination. Furthermore, the reduction in the misclassification rate may be relative to a performance of machine learning model 170 prior to the one or more parameters being updated.

Training a Machine Learning Model to Detect Offensive Content

Figure 2:
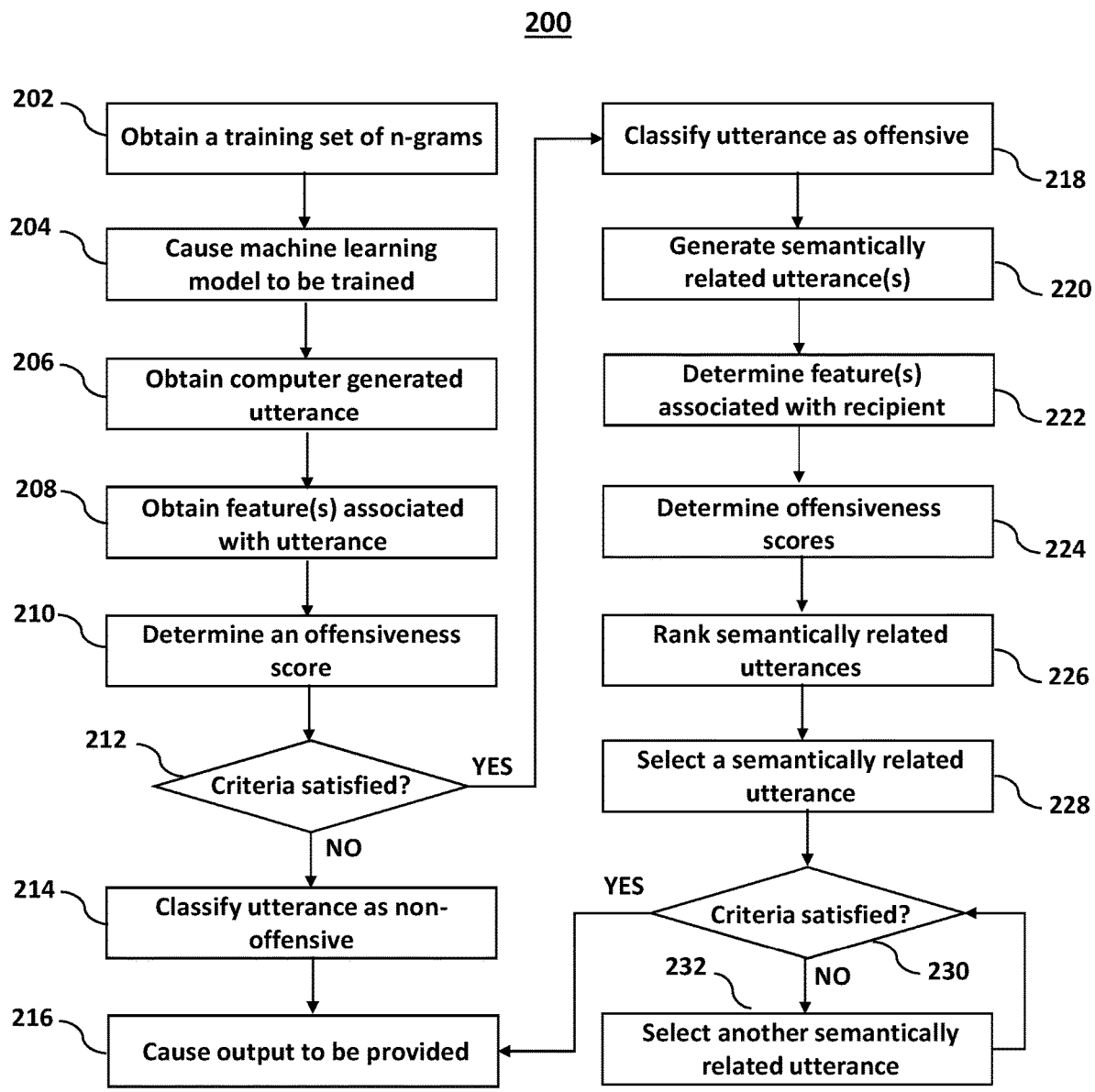
FIG. 2 is a flowchart of an example of a process for determining, using a trained machine learning model, whether a computer-generated utterance is offensive or non-offensive, in accordance with some embodiments of the present techniques.

FIG. 2 is a flowchart of an example of a process for determining, using a trained machine learning model, whether a computer-generated utterance is classified as offensive or non-offensive, in accordance with some embodiments of the present techniques. Process 200 may be implemented, in some cases, via machine learning model system 110 or n-gram extraction system 130, described above and further herein, though embodiments are not limited to these implementations, which is not to suggest that any other description herein is limiting. In some embodiments, the described functionality of process 200 and functionality described elsewhere herein may be implemented with machine-readable instructions stored on a tangible, non-transitory, machine-readable medium, such that when the instructions are executed, the described functionality may be implemented. In some embodiments, notwithstanding use of the singular term "medium," these instructions may be stored on a plurality of different memory devices (which may include dynamic and persistent storage), and different processors may execute different subsets of the instructions, an arrangement consistent with use of the singular term "medium." In some embodiments, the described operations (with reference to this figure and the others) may be executed in a different order from that displayed, operations may be omitted, additional operations may be inserted, some operations may be executed concurrently, some operations may be executed serially, and some operations may be replicated, none of which is to suggest that any other description is limiting.

Process 200 of FIG. 2 may, in some embodiments, begin at step 202. At step 202, a training set of n-grams may be obtained. The training set of n-grams may include n-grams labeled as offensive. In some embodiments, a corpus of unstructured natural language text may be obtained. For example, a corpus of unstructured natural language text may be obtained from sources 140 and stored within text database 160. A plurality of n-grams may be parsed from the corpus of unstructured natural language text. For each n-gram of the plurality of n-grams, an offensiveness score may be determined based on a natural language processing semantic analysis of responses to usage of the corresponding n-gram in the corpus of unstructured natural language text. For example, if the corpus includes social media posts, then the offensiveness score may be determined by performing a semantic analysis on the responses to those posts. The offensiveness score may indicate a likelihood that a reaction to that particular n-gram for a particular audience will be negative. For instance, for a particular age demographic of recipients of the n-gram, the offensiveness score may indicate a likelihood that an individual within that age demographic will negatively react to the n-gram. In some embodiments, the offensiveness scores, or values determined based on the offensiveness score, may be mapped to the corresponding n-gram as labels for that/those n-grams. For example, a first n-gram may be determined to have a first offensiveness score, which may be mapped to the first n-gram as a label.

Furthermore, in some embodiments, at least some of the n-grams in the training set of n-grams may include five or more words (e.g., n=5). The n-grams may be natural language tokens or intermediate representations of an NLP model. The n-grams may be arranged in structured form, as well as, or alternatively as, unstructured form. Furthermore, in some embodiments, labels may be mapped one-to-one or one label may be mapped to many n-grams. Still further, some n-grams may have many labels associated therewith, each label corresponding to a difference audience (e.g., different features associated with recipients of the n-grams).

At step 204, a machine learning model may be caused to be trained. For instance, a machine learning model, such as machine learning model 170, may be caused to be trained based on the training set of n-grams obtained at step 202. When machine learning model 170 is trained, for example, machine learning model 170 may be configured to classify natural language text as offensive or non-offensive. Machine learning model 170 may correspond to or include a supervised machine learning model. Furthermore, machine learning model 170 may include a software development tool or a suite of software-development tools. For example, machine learning model 170 may be used to assist in software developers develop software for release to one or more client devices. However, in alternative embodiments, an unsupervised machine learning model may be employed. In some embodiments, machine learning model 170 may be trained based on a first sub-set of n-grams from the training set of n-grams. Furthermore, machine learning model 170, trained based on the first sub-set of n-grams, may be cross-validated based on a second sub-set of n-grams, where the second sub-set of n-grams at least partially differs from the first sub-set of n-grams. In further embodiments, machine learning model 170 may be re-trained based on feedback (e.g., feedback 108) obtained by machine learning model system 110. For instance, machine learning model 170 may be trained based on feedback from the classification of input text 104 performed by machine learning model 170 (e.g., feedback regarding output 106).

At step 206, a computer-generated utterance may be obtained. For instance, input natural language text expressing the computer-generated utterance may be obtained. In some embodiments, the computer-generated utterance may correspond to an output from an utterance generation engine. For example, the computer-generated utterance may correspond to an output from a chatbot, a machine translation system, a text summarization model, or a STT processing system. In some embodiments, the computer-generated utterance may include one or more words or phrases not included within the training set of n-grams. For example, the computer-generated utterance may include n-grams absent from the training set of n-grams.

At step 208, one or more features associated with the computer-generated utterance may be obtained. For example, the one or more features may include temporal features, such as a timestamp indicating a time that the computer-generated utterance was generated (e.g., by an utterance generation engine) or received (e.g., by machine learning model system 110). As another example, the one or more features may include linguistic features, such as a language that the utterance was generated in. As yet another example, the one or more features may include features associated with a user that provided an input causing the utterance to be generated. For instance, a user may provide input text to a chatbot, which in turn may generate user-facing content (e.g., the computer-generated utterance) to be provided to the user. In this particular scenario, the one or more features obtained may include profile information associated with the user (e.g., user name, user profile, demographic information, etc.), linguistic properties associated with the user (e.g., a language or languages associated with the user), geographic information (e.g., a GPS location of the user, IP address of the user's device, a MAC address of the user's device, etc.), and the like.

In some embodiments, features associated with at least some of the n-grams from the training set of n-grams may also be obtained. For example, the features may include demographic information associated with a provider of a particular n-gram (e.g., a provider of a response to a usage of an n-gram). In one particular example, the demographic information may be associated with a provider of a response to a usage of a particular n-gram that is indicative of offensiveness. As another example, the features may include, or otherwise be accompanied with, temporal metadata indicating a time that the response to a particular n-gram, indicated as being offensive, was generated. In this particular scenario, the training of machine learning model 170 may be based on the features (e.g., demographic information, temporal metadata). Although the above referenced features were described with reference to demographic information and temporal metadata, or other feature, such as those additional features described herein, may be obtained for one or more n-grams of the training set of n-grams, and the aforementioned is merely exemplary.

At step 210, an offensiveness score for the computer-generated utterance may be determined. The offensiveness score may indicate a likelihood that an audience reaction to the computer-generated utterance will be negative. In some embodiments, the offensiveness score may be computed by generating a feature vector for the computer-generated utterance. The feature vector may be n-dimensional, and may further be weighted in accordance with the one or more features associated with the computer-generated utterance that were obtained at step 208. In some embodiments, the feature vector of the computer-generated utterance and the feature vector of the one or more of the n-grams may have a number of dimensions corresponding to term-frequency inverse document frequency ("TFIDF") scores of different terms among the n-grams in the training set. Upon generation of the feature vector, a similarity between the feature vector and another feature vector, or vectors, associated with one or more n-grams from the training set of n-grams 102 that were labeled as offensive, may be determined. In some embodiments, the similarity may be determined by computing one or more of a cosine angle between the feature vector of the computer-generated utterance and each feature vector of the n-grams labeled as offensive, a Minkowski distance between the vectors, or a Euclidean distance between the feature vectors.

At step 212, a determination may be made as to whether offensive score criteria have been satisfied. In some embodiments, the offensive score criteria may correspond to one or more threshold values that is/are to be compared with the offensiveness score generated for the utterance. For example, the offensiveness score determined for the computer-generated utterance may be compared to an offensiveness score threshold. In this particular example, if the offensiveness score is determined to exceed the offensiveness score threshold, then the offensiveness score for the computer-generated utterance may be said to satisfy the offensive score criterion (or criteria if multiple thresholds/comparisons are performed). In this instance, process 200 may proceed to step 218. However, if in this particular example the offensiveness score is determined to be less than or equal to the offensiveness score threshold, then the offensiveness score for the computer-generated utterance may be said to not satisfy the offensive score criteria. In this instance, process 200 may proceed to step 214. For instance, alternative embodiments may include scenarios where the criterion/criteria is/are satisfied if the offensiveness score is less than the threshold, less than or equal to the threshold, greater than or equal to the threshold, greater than or equal to a first threshold and less than or equal to a second threshold, and the like. In some embodiments, the offensiveness score may relate to how likely a given utterance will offend a particular recipient. Therefore, in this example, the higher the offensiveness score, the more likely the utterance will offend, whereas the lower the score, the less likely the utterance will offend.

At step 214, in response to determine that the offensive score criteria (or criterion) was not satisfied at step 212, machine learning model 170 may classify the computer-generated utterance as non-offensive. For instance, classifying module 114 may classify the computer-generated utterance as non-offensive after machine learning model 170 was trained (e.g., at step 204). At step 216, an output may be caused to be provided. For instance, classifying module 114 may cause output 106 to be provided to a recipient, such as a user operating client device 150. In this particular scenario, the output may include the computer-generated utterance, which has been classified by machine learning model 170 as non-offensive, and thus unlikely to be perceived as negative by the recipient.

Process 200 may proceed to step 218 in response to determining, at step 212, that the offensiveness score criteria was satisfied. At step 218, machine learning module 170 may classify the computer-generated utterance as offensive. For instance, classifying module 114 may classify the computer-generated utterance as offensive after machine learning model 170 was trained (e.g., at step 204).

At step 220, one or more semantically related utterances may be generated. For instance, classifying module 114 may, upon determining that machine learning model 170 classified the computer-generated utterance as offensive, generate one or more additional utterances that are determined to be semantically related to the computer-generated utterance. In some embodiments, classifying module 114 may identify or generate computer-generated utterances that are semantically related to a given utterance using LSA or Word2Vec techniques. In some embodiments, the one or more semantically related utterances may be selected from a pre-generated collection of computer-generated utterances having a feature vector that is within a threshold distance in a vector space to the computer-generated utterance deemed offensive (e.g., based on cosine angle).

At step 222, one or more features associated with a recipient, or an intended recipient, of the computer-generated utterance classified as offensive may be determined. For instance, the features may relate to demographic information (e.g., age, gender, etc.), geographic information (e.g., location), profile information (e.g., user interests, additional utterances provided by that recipient), and the like. In some embodiments, the recipient may correspond to a registered user of client device 150. For instance, the registered user may be the primary individual known to operate and interact with client device 150. In some embodiments, the recipient may be determined based upon login information provided to machine learning model system 110 from client device 150. Still further, biometric information (e.g., audio fingerprints, facial recognition data, retinal information, etc.) may be employed to identify the recipient, and thus the features associated therewith. Although the recipient may correspond to the user to receive the computer-generated utterance, the term recipient is not limited to a recipient that does receive the computer-generated utterance, but may further include a prospective recipient of the computer-generated utterance.

At step 224, offensiveness scores for each of the one or more semantically related utterances may be determined. In some embodiments, determination of the offensiveness scores may be based on the one or more features obtained at step 222. In this way, the features of the recipient (or intended recipient) may influence what machine learning module 170 will classify as offensive and non-offensive. For example, a first offensiveness score may be determined for a first semantically related utterance based on demographic information associated with a first recipient, however a second, different, offensiveness score may be determined for the first semantically related utterance based on different demographic information associated with a second recipient. In other words, based on the recipient's features (e.g., demographic information, geographic information, linguistic information, temporal information, etc.), machine learning model 170 may classify a computer-generated utterance as offensive or non-offensive, while for a different recipient's features, machine learning model 170 may classify the same computer-generated utterance differently.

At step 226, the one or more semantically related utterances may be ranked. In some embodiments, a ranking of the one or more semantically related utterances may be determined based on the offensiveness scores associated with each semantically related utterance. Furthermore, in some embodiments, the ranking of the one or more semantically related utterances may be determined based on a semantic similarity to the computer-generated utterance. For example, the ranking may initially be based on semantically similarity (e.g., according to cosine angle, Minkowski distance, Euclidean distance) between vectors of the computer-generated utterance and each of the one or more semantically related utterances. After ranking based on semantically similarity, the ranking of the semantically related utterances may be re-ranked based on the offensiveness score associated with each semantically related utterance.

At step 228, a semantically related utterance may be selected from the ranked list of semantically related utterances. In some embodiments, the selected utterance may be the top, or highest, ranked utterance from the ranked list. For instance, classifying module 170 may select the highest ranked utterance from the ranked list of semantically related utterances. At step 230, another determination may be made as to whether one or more criteria are satisfied. In some embodiments, the criteria of step 230 may be substantially similar to the criteria of step 212, and the previous description may apply. For example, the criteria of step 230 may correspond to an offensiveness score threshold, where the selected utterance's offensiveness score is compared with the offensiveness score threshold to determine whether the selected utterance is classified as offensive or non-offensive. If, at step 230, classifying module 114 determines that the selected utterance satisfies the offensiveness criteria, then process 200 may proceed to step 216. In this particular scenario, the output to be provided may include the semantically related utterance, which has been classified by machine learning model 170 as non-offensive based, at least in part, on the features associated with the recipient.

However, if at step 230, classifying module 114 determines that the selected utterance does not satisfy the offensiveness criteria, then process 200 may proceed to step 232. At step 232, another semantically related utterance from the ranked list of semantically related utterances may be selected. In one embodiment, the semantically related utterance selected at step 232 may correspond to a next highest ranked utterance after the utterance selected at step 228. This semantically related utterance (e.g., the utterance selected at step 232), may then be analyzed, at step 230, to determine whether the new semantically related utterance satisfies the offensiveness criteria. Steps 230 and 232 may repeat until the offensiveness criteria of step 230 is satisfied.

In some embodiments, however, no output may be provided. For instance, if no semantically related utterances are determined to satisfy the offensiveness criteria, then machine learning model system 110 may prevent output 106 from being provided to a recipient.

In some embodiments, machine learning model 170 may be further trained based on feedback from the classifications of the computer-generated utterance by machine learning model 170. For example, and as described below, computer-generated utterances that machine learning model 170 classifies as offensive may be provided back to training module 112 to form additional training data. This additional training data may then be used to train machine learning model 170. In some embodiments, output 106 may be provided to machine learning model 170 with an exogenous classification of the computer-generated utterance as offensive or non-offensive. For example, the exogenous classification may be obtained by a supervised or unsupervised analysis of the output of machine learning model 170. As another example, the exogenous classification may correspond to feedback from a user, which may or may not correspond to the recipient of output 106. For instance, human labeling of output 106 may be performed and included with output 106 when provided to machine learning model 170. The exogenous classification may classify the computer-generated utterance as offensive or non-offensive. In response to being provided the output with the exogenous classification, training module 112 may cause machine learning model 170 to be further trained.

Figure 3:
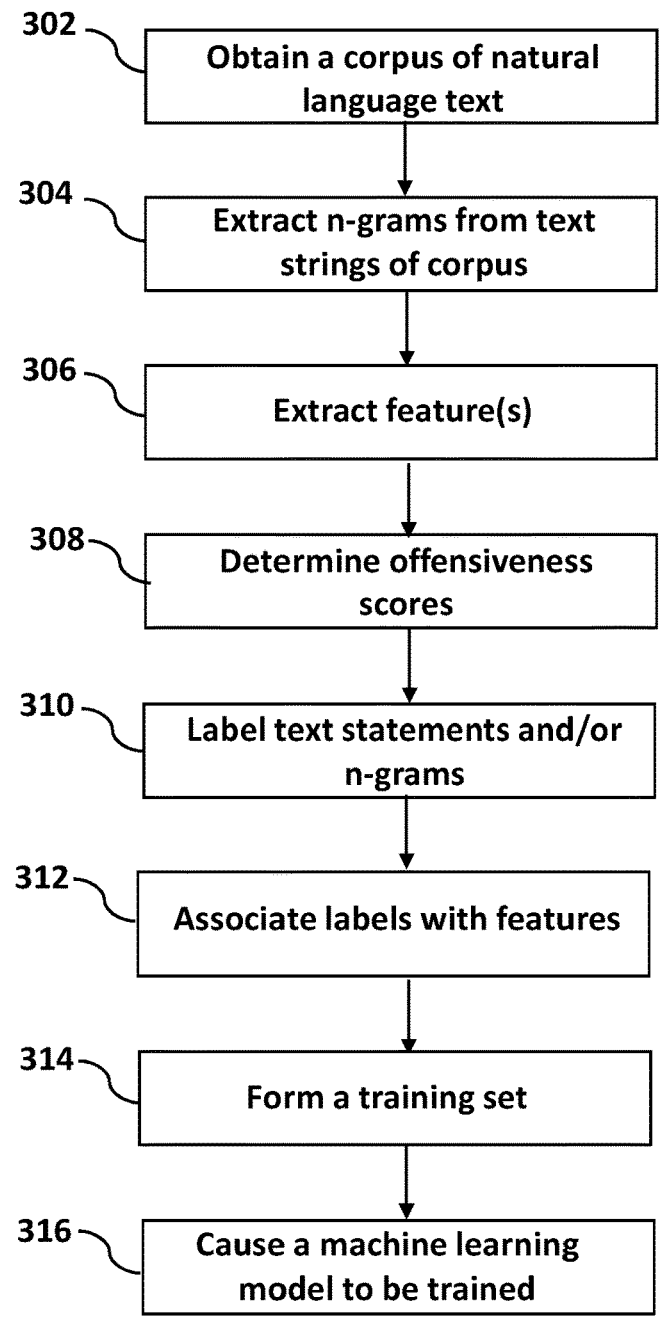
FIG. 3 is a flowchart of an example of a process for generating training data for a machine learning model such that the machine learning model is capable of determining whether an input utterance is offensive, in accordance with some embodiments of the present techniques.

Forming a Training Set for Training a Machine Learning Model to Classify Utterances as Offensive or Non-Offensive FIG. 3 is a flowchart of an example of a process for generating training data for a machine learning model such that the machine learning model is capable of determining whether an input utterance is offensive, in accordance with some embodiments of the present techniques. Process 300 may be implemented, in some cases, via machine learning model system 110 or n-gram extraction system 130, described above and further herein, though embodiments are not limited to these implementations, which is not to suggest that any other description herein is limiting.

Process 300 may, in some embodiments, begin at step 302. At step 302, a corpus of natural language text may be obtained. In some embodiments, a corpus of unstructured natural language text statements and corresponding responses to the statements by responding users may be obtained. The corresponding responses in one embodiment may be responsive natural language statements or responding user expressed scores. For example, natural language text statements may correspond to one or more social media posts, which may be stored or obtained from one or more sources 140. The corresponding responses may also, in one embodiment, be responsive natural language text statements. Continuing the previous example, the corresponding responses to the social media posts may include responses, responsive feedback (e.g., likes, dislikes), and multimedia content that respond to the social media posts. In some embodiments, the corresponding responses may be responding user expressed scores indicative of how a responding user perceived the unstructured natural language text. For example, if a responding user expressed score tends to suppress unstructured natural language text statements in a feed of unstructured natural language text statements, then this may indicate that the unstructured natural language text was perceived as offensive. In some embodiments, the corpus of unstructured natural language text statements may include conversations of social networks. In this example, the conversations may include metadata indicating an author of the corresponding conversation, as well as statements to which subsequent statements in the conversations are responsive to. For example, the metadata may include a conversation identifier indicating a particular conversation that a comment is associated with.

The unstructured natural language text statements may be obtained periodically (e.g., every hour, every day, every week), upon request form a user or system administrator, or in response to a detected event, such as a major news event. In some embodiments, responding user expressed scores tending to suppress unstructured natural language text statements in a feed of unstructured natural language text statements may be scores as indicating offense. For example, if a large number of responses to a social media post are dislikes (e.g., indications of disapproval), in an attempt to suppress the view, reach, or perception of the social media post, may be used to indicate that the social media post is offensive.

At step 304, one or more n-grams may be extracted from text strings of the corpus. In some embodiments, the corpus of unstructured natural language text statements may include a plurality of text strings. For example, a text string may correspond to one or more groupings of characters (e.g., letters, numbers, symbols). While each text string may be formed such that it expresses an understandable sentiment, this need not be required, and the text string may be random or semi-random as well. Each text string may include one or more sub-threads of text corresponding to a response to the text string and encoding one or more of the responses by the responding users. Using the example where the unstructured natural language text corresponds to social media posts, the one or more sub-threads of text may correspond to a response or comment to a particular social media posts. As a non-limiting illustrative example, a social media post may include a text string, "Happy Birthday, John!" and a corresponding response to that social media post may include the sub-thread of text, "Thank you!"

In some embodiments, one or more n-grams included within each of the plurality of text strings may be extracted. The n-grams may be of any suitable dimensionality (e.g., n=1, 2, . . . , k). For example, a parser may be used, by n-gram extraction system 130 or training module 112, to parse each text string to identify and extract one or more n-grams included therein. In some embodiments, for each of the one or more n-grams extracted from each of the text strings, one or more additional n-grams associated with each sub-thread of text may be determined. For example, the one or more additional n-grams may correspond to n-grams determined to be included within a response to a corresponding social media post.

At step 306, one or more features may be extracted. For instance, demographic features (e.g., age, gender, ethnicity, etc.) may be obtained for each responding user. Additionally or alternatively, other features, such as, and without limitation, geographic features, temporal features, and the like, may also be obtained. In some embodiments, the features may be obtained from source 140 with the corpus of unstructured natural language text statements and corresponding responses. For example, a comment from a particular user responding to a social media post may be identified, and profile information associated with the user that provided the comment may be extracted and provided to n-gram extraction system 130 or training module 112. In some embodiments, the one or more features may be obtained via an application programming interface ("API") of a social network site in a structured data hierarchical data serialization format.

At step 308, an offensiveness score may be determined. In some embodiments, the corresponding responses to the unstructured natural language text statements may be scored based on whether that corresponding response indicates offense to the unstructured natural language text statement. In some embodiments, an offensiveness score associated with a text string included within an unstructured natural language text statement may be determined based on one or more n-grams associated with a sub-thread of that text. For example, based on the n-grams included within a response to a social media post, an offensiveness score may be determined for the social media post. In some embodiments, the offensiveness score may be further based on the one or more features previously obtained at step 306. In some embodiments, responsive natural language text statements may be scored by classifying the responsive natural language text statements as indicating offense. In this particular scenario, the classifying of the responsive natural language text statements may be implemented by use of a natural language processing sentiment analysis model.

In some embodiments, an amount (like a count or frequency) of sub-threads of text associated each text string of the plurality of text strings may be determined. For example, a particular social media post may have one or two comments, whereas another social media post may have one hundred comments. The offensiveness score may then be determined based on the number/amount of sub-threads of text. For example, a highly offensive social media post is more likely to have a large number of comments responding to the post as opposed to a social media post that is not offensive. Furthermore, the offensiveness score for a particular text string may be determined based, in one embodiment, on the one or more n-grams included within each sub-thread of text associated with that text string.

At step 310, the text statements or n-grams included therein may be labeled. For instance, the unstructured natural language text statements or the n-grams included therein may be labeled based on the offensiveness scores of the corresponding responses. In some embodiments, each of the text strings and the sub-threads of text associated therewith may include temporal metadata indicating a timestamp (which may be a quantization thereof) of when that particular text string and sub-thread of text were provided (e.g., generated, input, composed, etc.). Based on the timestamps, an amount of time between when each text string was generated and when each of the plurality of sub-threads of text strings were generated, may be determined. Based on the amount of time, the offensiveness score may be determined so as to classify the text string as offensive or non-offensive. For example, if the amount of time between a social media post and the responses thereto is less than a temporal threshold (e.g., a few seconds, a few minutes, etc.), then this may indicate that the social media post was offensive, and that the responses are immediately responding to that offensive post.

In some embodiments, a first subset of n-grams of a given unstructured natural language text statement may be labeled as offensive, or causing offense, while a second subset of n-grams in the given unstructured natural language text statement may be labeled as non-offensive, or not causing offense. In this particular scenario, the first subset of n-grams may be selected in response to a natural language processing topic model indicating a subset of topics in the unstructured natural language text statement appear in response to a responsive natural language text statement of a corresponding response to that unstructured natural language text statement indicating offense.

At step 312, the labels may be associated with the features. For example, labels for the unstructured natural language text statements or n-grams included therein may be associated with demographic features associated with the corresponding responding users, thereby contributing to the offensiveness scores upon which the respective labels are based. For instance, the offensiveness scores, as mentioned above, may be determined based at least in part on the features associated with the responding users. Therefore, the labeling may be associated with the features to indicate which features relate to a particular label, and vice versa. At step 314, a training set of n-grams may be formed. For instance, the training set may be formed at least in part by the labeling and associating of steps 310 and 312, as described above.

Additional entries for the training set may also be generated, either in addition to the previously described steps for forming the training set, or at a later point in time. For instance, one or more semantically related n-grams may be determined for each n-gram labeled as being offensive. To determine the semantically related n-grams, LSA, LDS, or Word2Vec semantic analysis techniques may be employed to identify n-grams whose feature vectors are similar to a particular n-gram's feature vector classified as offensive. Classification information may further be generated including at least one of the one or more semantically related n-grams that is classified as offensive. The additional entries for the training set may then be generated based on the classification information. In some embodiments, the training set may be expanded by determining that a given unstructured natural language text statement or a given n-gram included therein is semantically similar to another unstructured natural language text statement or another n-gram therein. For instance, the semantically similar unstructured natural language text statements or n-grams included therein may be determined using at least one of a Word2Vec model or an LSA model. In this particular scenario, the label of a given unstructured natural language text statement or n-gram included therein may also be applied to the other unstructured natural language text statement or other n-gram included therein that is determined to be semantically similar.

At step 314, a machine learning model may be caused to be trained. For example, training module 112 may cause machine learning model 170 to be trained based on the training set. In some embodiments, machine learning model 170 may be trained such that it is configured to classify natural language utterances as offensive or non-offensive. Still further, machine learning model 170 may be trained such that it is configured to generate one or more utterances based on the training set. In some embodiments, causing the machine learning model configured to classify natural language utterances as offensive or non-offensive to be trained may include training the machine learning model. Training of the machine learning model may include iteratively adjusting parameters of the machine learning model to reduce a rate at which the machine learning model mispredicts the labels (e.g., mislabels) n-grams in the training set. In some embodiments, the machine learning model may be trained with the training set, and computer-generated utterances may be classified using the trained machine learning model or utterances may be generated using the trained machine learning model.

Data output by machine learning model 170 may also be obtained and used to expand/add to the training set. For example, data output by machine learning model 170 that represents one or more utterances that machine learning model 170 classified as offensive may be obtained. Features associated with each of the one or more utterances may be extracted. For example, the features may include information regarding the features associated with the utterance, temporal information regarding the utterances, or features associated with an intended recipient of the utterance, who may or may not have been provided with the utterance. Additional entries for the training set may be generated by training module 112 based on the data and the one or more features extracted.

In some embodiments, an additional corpus of unstructured natural language text may be obtained. The unstructured natural language text of the additional corpus may include a first plurality of n-grams. One or more features associated with each of the first plurality of n-grams may be extracted. For example, features indicating demographic information of a user that generated the text, geographic information about the user, linguistic information about the text, or temporal information about the text may be extracted. Based on the extracted features, a second plurality of n-grams from the first plurality of n-grams may be selected. Each of the n-grams of the second plurality of n-grams may be classified as offensive or non-offensive based on the extracted feature, for example.

Updating Machine Learning Model Parameters Based on Feedback

Figure 4:
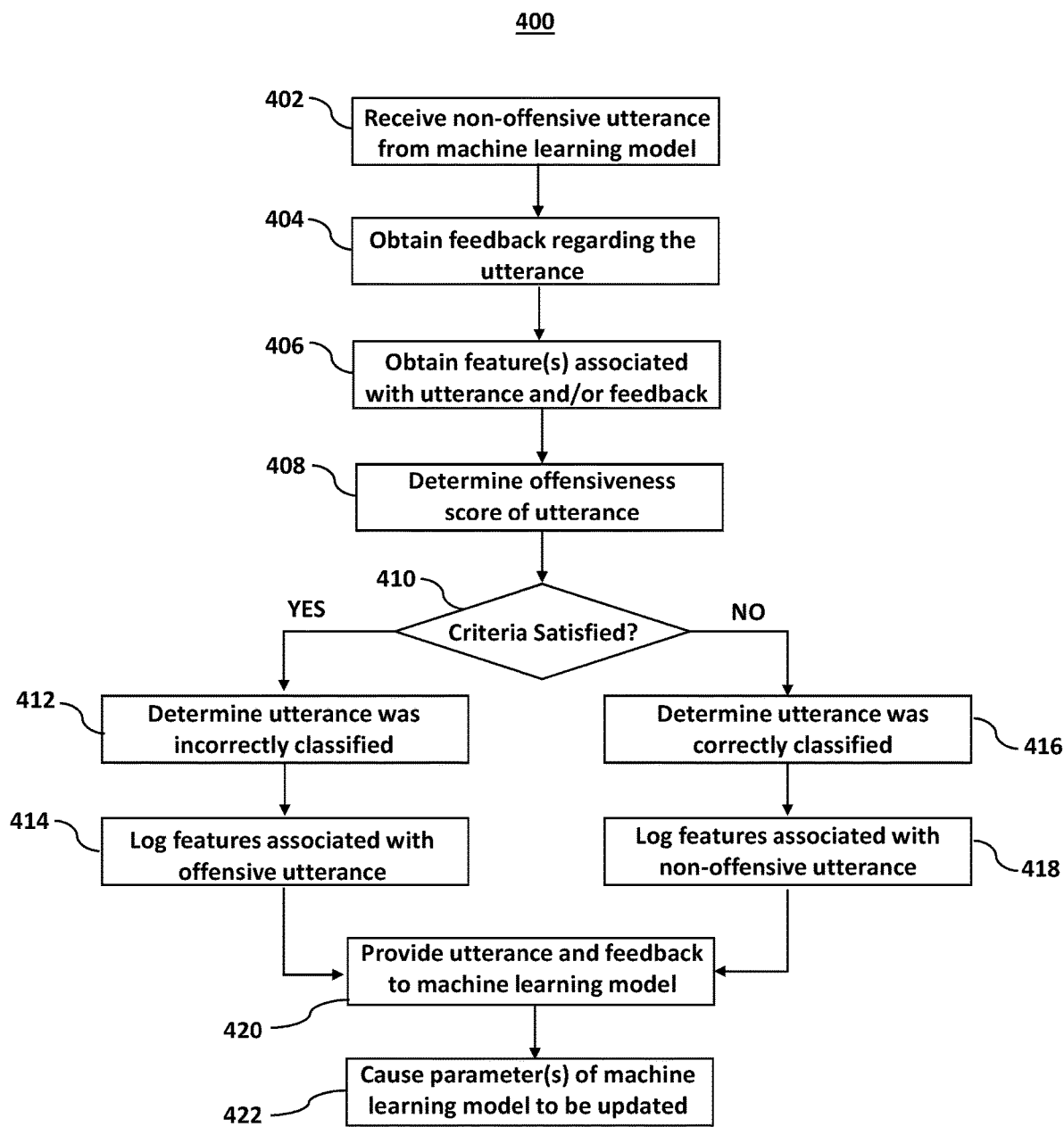
FIG. 4 is a flowchart of an example of a process for obtaining feedback to outputs from a machine learning model, and causing the machine learning model to be updated based on the feedback, in accordance with some embodiments of the present techniques.

FIG. 4 is an illustrative flowchart of an exemplary processor for obtaining feedback to outputs from a machine learning model, and causing the machine learning model to be updated based on the feedback, in accordance with some embodiments of the present techniques. Process 400 may be implemented, in some cases, via machine learning model system 110, described above and further herein, though embodiments are not limited to these implementations, which is not to suggest that any other description herein is limiting.

Process 400, in some embodiments, may begin at step 402. At step 402, one or more utterances may be received from a machine learning model, where the one or more utterances were classified by the machine learning model as non-offensive. For example, machine learning model 170 may be configured to classify input text as offensive or non-offensive. For instance, machine learning model 170 may classify a computer generated as non-offensive. In one embodiment, the computer-generated utterance classified as non-offensive may be received by feedback module 116 of machine learning model system 110. The computer-generated utterance may be based on an output of various natural language processing systems such as, and without limitation, chatbots, machine-translation processes, or natural language processing abstractive text summarization processes. In one embodiment, the machine learning model (e.g., machine learning model 170) may correspond to a supervised learning bag-of-words model trained on phrases that each may have a plurality of labels indicating whether those phrases were designated as offensive at different times to different populations of users having different demographic attributed. For example, a first demographic of users (e.g., from a first country or region) may designate a certain phrase as offensive, while a second demographic of users (e.g., from a second country or region) may designate the same phrase as non-offensive. As another example, a demographic of users may designate a certain phrase as offensive at a first time (e.g., during a first era of time), while at a second time (e.g., during a second era of time) the same demographic of users may designate the phrase as non-offensive. The computer-generated utterance may differ (e.g., may not be one of) the phrases that the supervised learning bag-of-words model was trained, in an embodiment.

In some embodiments, machine learning model 170 may be configured to stochastically misclassify computer-generated utterances. For instance, machine learning model 170 may classify computer-generated utterances with an accompanying probability dependent, at least partially, on a score indicative of an offensiveness of n-grams in misclassified computer-generated utterances. The misclassified utterances may be designated as non-offensive after feedback, received with respect to those utterances, fails to indicate that the misclassified utterance are still offensive.

At step 404, feedback regarding the utterance may be obtained. For instance, feedback 108 may be obtained from client device 150 responsive to the computer-generated utterance being output thereto. In some embodiments, the feedback may be obtained in response to the computer generating utterance being provided to one or more communications platforms that are configured to receive feedback from one or more users. The feedback may be indicative of an audience reaction to the computer-generated utterance. For example, the computer-generated utterance may be provided to a social media network website within an interface capable of receiving feedback from one or more respondents. The audience reaction to the computer-generated utterance may be determined based on the feedback to the computer-generated utterance presented within the interface of the social media network website. In this example, users accessing the social media network website may view the computer-generated utterance, and may provide feedback, such as unstructured natural language text, to the computer-generated utterance. In some embodiments, one or more instances of feedback may be received. For example, multiple responding users may provide different feedback 108 to the computer-generated utterance. Furthermore, in some embodiments the feedback (e.g., feedback 108) may include additional text from the audience, where the additional text may include one or more n-grams.

At step 406, one or more features associated with the computer-generated utterance or the feedback may be obtained. In some embodiments, the features may correspond to metadata associated with the utterance or feedback. The various types of features that may be associated with the utterance may include, but are not limited to, demographic information associated with an intended recipient or recipients of the computer-generated utterance, linguistic information regarding the utterance, temporal information indicating a time when the utterance was generated, offensiveness information indicating how offensive the machine learning model classified the utterance as being, and the like. The various types of features that may be associated with the feedback may include, but is not limited to, demographic information associated with a responding user that provided the feedback (e.g., a user account, profile information, age bracket, gender, ethnicity, interests, etc.), temporal information associated with when the feedback was provided (e.g., a timestamp), linguistic information (e.g., a language that the feedback was formed), geographic information (e.g., an IP address, GPS location), and the like.

In some embodiments, the one or more features associated with the feedback (as well as the computer-generated utterance) may be used to determine a weighting of the feedback. For instance, the feedback may be weighted based on an age of the feedback, such as and without limitation, an age of the feedback with respect to the computer-generated utterance. In this particular scenario, as described below, the weighting may be employed when determining or causing parameters of machine learning model 170 to be updated.

In some embodiments, a frequency of the feedback obtained may be determined. The frequency may indicate whether computer-generated utterance was perceived as offensive. For example, a large number of responses to a social media post in a relatively short amount of time may indicate a negative reaction from an audience to the computer-generated utterance. The frequency with which the feedback is obtained may be compared to an offensive language frequency threshold. If the frequency of the feedback obtained exceeds the offensive language frequency threshold, then feedback module 116 may determine that the computer-generated utterance is to be classified as offensive. Accordingly, when parameters of machine learning model 170 are updated, the updates to those parameters may be reflective of the computer-generated utterance being classified as offensive based on the frequency of the feedback.

At step 408, an offensiveness score of the computer-generated utterance may be determined. In some embodiments, the offensiveness score of the computer-generated utterance may be determined by determining a feedback score of the feedback. The feedback score may indicate how offensive an audience reaction perceived the computer-generated utterance to be. In this particular scenario, the offensiveness score of the computer-generated utterance may be determined based on the feedback scores. For instance, the computer-generated utterance, which was initially classified as non-offensive, may be determined to be offensive based on whether the feedback scores satisfied a threshold criterion (or criteria). As an illustrative example, a frequency of the feedback may be determined. If the frequency of the feedback is determined to exceed an offensive language frequency threshold, then this may indicate that the computer-generated utterance is determined to be classified as offensive.

At step 410, a determination may be made as to whether offensiveness criteria has been satisfied. As mentioned above, the offensiveness criteria may correspond to whether an offensiveness score for the computer-generated utterance satisfies an offensiveness score threshold based on the feedback. For example, if the feedback score exceeds feedback score threshold, then this may indicate that the offensiveness score of the computer-generated utterance exceeds an offensiveness score threshold, thereby indicating that the computer-generated utterance should be classified as offensive. If, at step 410, it is determined that the criteria has been satisfied, then process 400 may proceed to step 412. However, if at step 410 it is determined that the criteria has not been satisfied, then process 400 may proceed to step 416.

At step 412, it may be determined that the computer-generated utterance was incorrectly classified as non-offensive. Machine learning model 170, which classified the computer-generated utterance as non-offensive, incorrectly classified the computer-generated utterance and instead the computer-generated utterance, based on the criteria being satisfied at step 410, should be classified as offensive. In some embodiments, a natural language processing sentiment analysis model may be used to determine whether the computer-generated utterance is perceived as offensive by the audience by classifying the unstructured natural language text of the feedback. At step 414, the features associated with the feedback or utterance that was misclassified may be logged. For example, each utterance and corresponding instance of feedback may be stored within text database 160, such as within a relational data structure. The features associated therewith may be logged so that, for each utterance or feedback, the corresponding features that produced the re-classification of the utterance as offensive may be stored.

In some embodiments, the feedback may include additional text form the audience in response to the computer-generated utterance. For example, where the computer-generated utterance is provided to an audience of users as a social media post, comments to the social media post may correspond to the additional text. In this particular scenario, the additional text may be parsed to identify one or more n-grams. At least one term or phrase that is included within a set of words or phrases designed as offensive may be detected from the one or more n-grams. The computer-generated utterance may then be classified as offensive to at least some populations of users in response to detecting the at least one term or phrase. For example, if a comment to a particular social media post includes a word or phrase that is included within a set of words deemed to be offensive to a particular group of individuals, then the computer-generated utterance may be classified as offensive. In some embodiments, the computer-generated utterance was classified by machine learning model 170 as offensive at a first time for a population of users. However, the feedback may indicate that at a second time occurring after the first time, the computer-generated utterance is not classified as offensive for that same population. For example, a certain word or phrase may have been deemed offensive to certain people at during one era, but as cultural and people evolve, the word or phrase may no longer be perceived as offensive by those same people.

At step 416, it may be determined that the utterance was classified correctly by the machine learning model. For example, if the feedback score does not satisfy threshold criteria, then the offensiveness score of the utterance may also be determined to not satisfy certain offensiveness criteria, indicating that machine learning model 170 correctly classified the utterance. At step 418, the features associated with the non-offensive utterance or the feedback to the utterance may be logged. In some embodiments, step 418 may be substantially similar to step 414, with the exception that at step 418 the utterance was determined to have been correctly classified.

Process 400 may proceed from step 414 or 418 to step 420. At step 420, the computer-generated utterance and the feedback may be provided to the machine learning model. In some embodiments, metadata associated with the utterance or the feedback may also be provided. For example, the metadata may indicate an original classification of the utterance (e.g., offensive or non-offensive), as well as a determined classification from steps 410-418. As another example, the metadata may indicate the features associated with the utterance, as well as, or alternatively, the features associated with the responding users that provided the feedback.

At step 420, one or more parameters of the machine learning model may be caused to be updated. For instance, updating module 118 of machine learning model system 110 may cause one or more parameters of machine learning model 170 to be updated based on the computer-generated utterance and a result of the determination of whether the computer-generated utterance is perceived as offensive by the audience. Alternatively, the one or more parameters may be caused to be updated based on the computer-generated utterance being determined to be perceived as non-offensive. In some embodiments, causing the one or more parameters of machine learning model 170 to be updated may include adjusting the one or more parameters in a direction that reduces a misclassification rate of machine learning model 170. For instance, the rate of misclassifying machine learning model 170 based on a training set of utterances that includes the computer-generated utterance and the result of the determined. The reduction of the rate of misclassifying may be relative to performance of the machine learning model prior to the update to the parameter occurring. For example, if the rate of misclassification (e.g., an error rate) before the parameters are updated is 5%, then after the parameters are adjusted, the rate of misclassification may be reduced to 3%.

In some embodiment, the weighting of the feedback based on the age of the feedback may be used to update the adjustment to the one or more parameters such that older feedback may impart less adjustment to the parameters of the machine learning model as compared to newer feedback of otherwise identical content. Furthermore, in some embodiments, the frequency of the feedback may be used for updating the one or more parameters of the machine learning model. For example, the parameters may be updated to reflect that, based on the frequency of the feedback, the computer-generated utterance is classified as offensive.

In one embodiments, the machine learning model corresponds to a four-or-higher time-slice dynamic Bayesian network configured to infer whether an audience having specified features (e.g., demographic features) will take offensive to a sequence of four or more words. In this particular scenario, updating the one or more parameters may include adjusting transition probabilities of a transition probability matrix having values indicative of conditional probabilities of the audience transitioning to a latent offended state conditional on the specific features. In another embodiment, the machine learning model may correspond to a recurrent neural network having long-short term memory units defining four or more cycles in a connection graph of the recurrent neural network. The recurrent neural network may be configured to infer whether an audience having specified demographic features will take offensive to a sequence of four or more words. In this particular scenario, the one or more parameters being updated includes a partial derivative of an objective function being calculated with respect to a weight or bias of the recurrent neural network. The weight or bias may be adjusted in a direction that the partial derivative indicates reduces an amount of misclassification of text as offensive or non-offensive. In yet another embodiment, the machine learning model may correspond to a bag-of-words model configured to classify text as offensive or non-offensive based on a distance in a feature space having dimensions corresponding to n-grams in the training set of phrases labeled as offensive or non-offensive. In this example, the one or more parameters being updated may include adjusting a magnitude of one or more feature vectors in the feature space. The magnitudes of the one or more features being adjusted may correspond to changing scalars of the feature vectors in dimensions corresponding to n-grams in the computer-generated utterance. Further still, in some embodiments, causing the one or more parameters of the machine learning model to be updated includes steps associated with training of the machine learning model. For example, updating the parameters may include performing additional training to machine learning model 170.

In some embodiments, the offensiveness score may be received from machine learning model 170. As mentioned above, the offensiveness score may indicate how offensive machine learning model 170 classified the computer-generated utterance as being. Subsequent to the one or more parameters being updated, machine learning model 170 may be caused to compute a revised offensiveness score based on the feedback. The revised offensiveness score and the original offensiveness score may then be compared to determine how the one or more parameters affected the offensiveness score for the utterance. This may allow for machine learning model 170 to be gauged to determine whether the update to the parameters improved the ability of machine learning model 170 to classify utterances as offensive or non-offensive. For example, if the offensiveness score initially indicated that an utterance was non-offensive, but the feedback indicates that the utterance was offensive, then the revised offensiveness score should indicate that the utterance, subsequent to the parameters being updated, is offensive.

Figure 5:
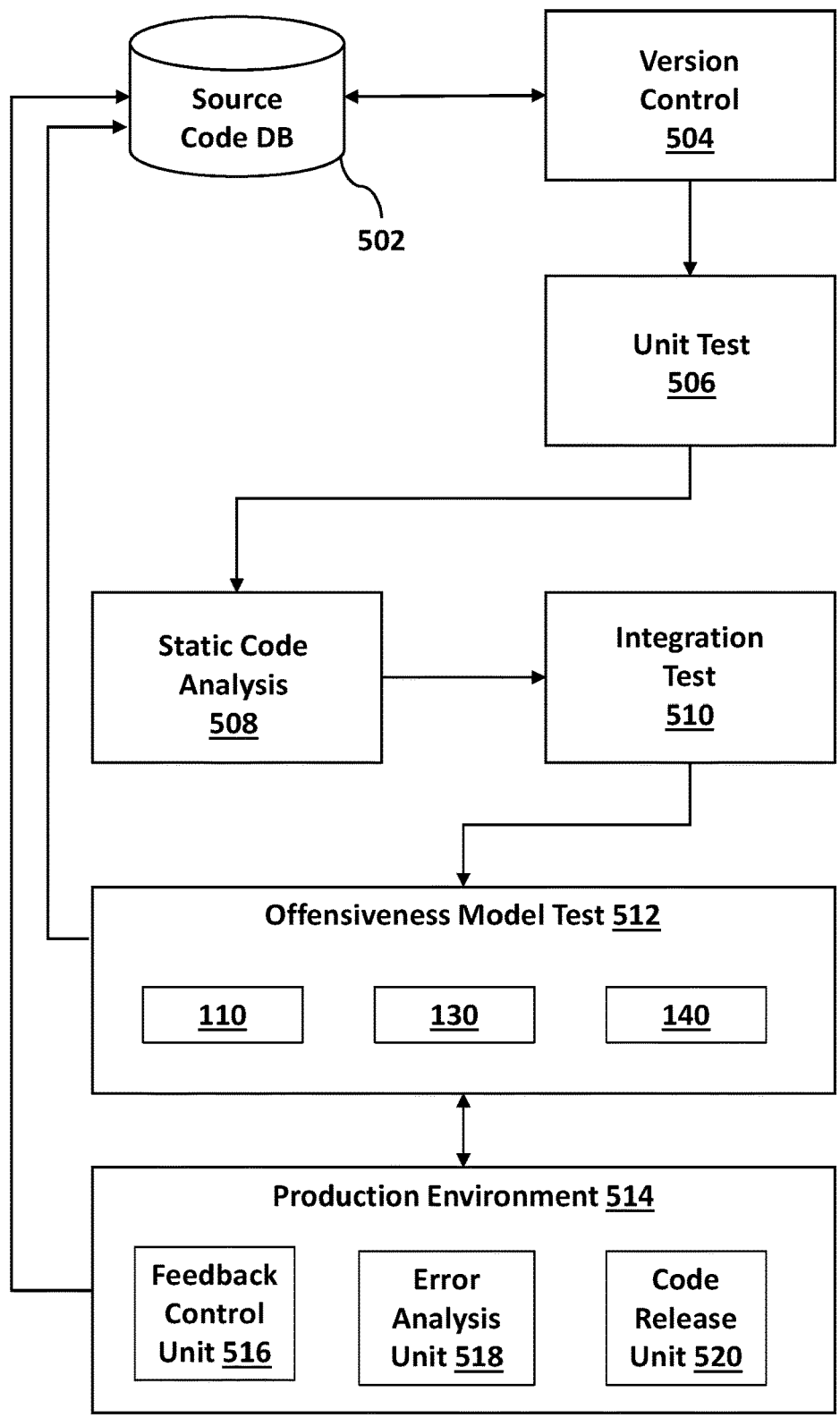
FIG. 5 is a diagram of an example of a software release pipeline including an offensiveness model testing aspect, in accordance with some embodiments of the present techniques.

FIG. 5 is an illustrative diagram of an exemplary software release pipeline including an offensiveness model testing aspect, in accordance with some embodiments of the present techniques. Software release pipeline 500, in the illustrative embodiment, may implement a process by which software may be released. Pipeline 500 may be configured to develop a machine learning model, such as machine learning model 170, deploying the machine learning model to one or more testing systems to test functionalities of the machine learning model, and release (e.g., deploy) the machine learning model to one or more consumer systems to be used to classify inputs as offensive or non-offensive, or to generate utterance. In one embodiment, software may be released using a continuous delivery techniques. Continuous delivery of software may relate to the process by which software may be released at any time in a repeatable manner so as to continually be able to deliver software code, and updates thereto, to one or more recipients. As another example, continuous deployment may be used to release software. Continuous deployment may differ from continuous delivery in that, with respect to continuous deployment, the software that is provided to the recipient completes one or more verification procedures, and therefore is deployed responsive to passing of the verification. In continuous delivery, the actual delivery of the software to the recipients need not occur upon passage of the verifications, and may be dependent on an administrator's or developer's needs or goals.

Pipeline 500 may include a source code database 502. Source code database may refer to a repository where all versions of software to be released are stored. The software stored within database 502 may be labeled with identifiers indicating a version of the software (e.g., version 1, version 2, . . . , version K), a timestamp associated with the version's creation, and various other identifiers such as a developer identifier or indication of the one or more changes to the software from a preceding version. Labeling of the software within source code database 502 is important so that a most updated version of the software code may be tested and subsequently provided to users. In some embodiments, changes to individual files of code may be tracked and stored independently within database 502, however in alternative embodiments, each change to the source code may result in a new version of code being stored and labeled accordingly.

In some embodiments, database 502 may correspond to a single database, however distributive databases may alternatively be used.

Version control unit 504 may correspond to another portion of pipeline 500. Version control unit 504 may be configured to manage the changes to the versions of software stored within source code database 502. For example, each time an edit is made to a portion of code, version control unit 504 may generate a new version identifier for the new version of code including the edits. Version control unit 504 may also be configured to log a timestamp associated with the new version's creation, as well as an identifier associated with the developer that made the change. Version control unit 504 may employ various types of version control systems and architectures. For instance, version control unit 504 may employ concurrency control techniques to prevent concurrent access (e.g., prevents two different attempts to write to a same file). In some embodiments, version control unit 504 may include, within a memory component, a log of all changes made to source code database 502. As mentioned above, version control unit 504 may be implemented via a centralized instance of source code database 502 or distributed instance of source code database 502.

In the centralized instance, a single database 502 may store each version of source code, and may provide a single file to each requesting device. An administrator may be able to control which requestors can perform which operations to which files, and a single file may be provided to a single user for editing at a time. Each file provided to a requestor may be said to be "checked-out" to that requestor, and no other requestor may make changes to that file until the requestor has "checked-in" the file. Centralized instances of database 502, however, may result in inaccessible files if anything occurs to database 502, as there is only one point of access to the code stored therein. In the distributed instance, the various versions of source code and code history are mirrored on a plurality of devices. By doing so, a same file may be accessed by multiple requestors, however care is needed to ensure concurrency control to prevent two different requestors simultaneously editing a same document, or from one requestor editing a document that is also being edited by another requestor unbeknownst to others.

Pipeline 500 may also include a unit test component 506. Unit testing component 506 may be configured to perform one or more tests to one or more units of software code obtained from source code database 502. For example, unit test component 506 may retrieve, or otherwise be provided with, blocks of code to be tested for determining whether or not that/those portions of code are usable. The overall goal of unit test component 506 is to isolate and identify whether any particular portion, also referred to as unit, of a particular version of source code is correct and functions properly. Unit test component 506 may be fully automated, partially automated, or manual, depending on the specifics of pipeline 500.

After testing via unit test component 506, static code analysis unit 508 may be used to analyze the version of software currently under review without execution of any programs. Static code analysis unit 508 may review a version of software code in a non-runtime environment to isolate whether any inputs or outputs to/from the software code cause errors. In particular, these errors may be difficult to identify during run-time, hence the review of the source code during non-runtime.

After unit testing and static code analysis by unit test component 506 and static code analysis unit 508, respectively, integration test unit 510 may be accessed to perform integration testing to the software code. It should be noted that, if a flaw or error is detecting by either unit test component 506 or static code analysis unit 508, the flaw or error may be corrected immediately, or the code may be returned to source code database 502 via version control unit 504, so as to not perform integration testing to problematic code. During integration testing, groups of software code, such as one or more files or modules of a particular version of code, may be tested together. Integration testing is to occur before validation testing, which ensures that the particular software code performs its desired tasks.

Offensiveness model test unit 512 may, in one embodiment, obtain the software code that has had integration testing performed thereto by integration test unit 510, where the software code has passed integration testing. Offensiveness model test unit 510 may include machine learning model system 110, n-gram extraction system 130, and sources 140. In one embodiment, offensiveness model test unit 512 may further include test database 160.

In some embodiments, the software code that is analyzed and tested may correspond to machine learning model 170, as described above. Therefore, part of pipeline 500 may include the various steps and aspects associated with ensuring that the outputs from machine learning model 170 do not include utterances that are offensive. In some embodiments, if additional training or updating of machine learning model 170 occurs, then offensiveness model test unit 512 may cause updates to parameters of machine learning model 170 to occur, and subsequently stored within source code database 502.

Offensiveness model test unit 512 may be followed within pipeline 500 by production environment 514. Production environment 514, in one embodiment, may be configured to release/deploy machine learning model 170 to one or more consumer systems. In some embodiments, machine learning model 170 may be a software development tool or a part of a suite of development tools. Production environment may include a feedback control unit 516, an error analysis unit 518, and a code release unit 520.

In some embodiments, upon completion of testing the machine learning model through components 506-512 of pipeline 500, the machine learning model may be released to one or more consumer devices (e.g., client device 150) via code release unit 520. Code release unit 520 may obtain the approved version of code either from offensiveness model test unit 512 upon verification, or from source code database 502. The code to facilitate operation of machine learning model 170 may then be deployed via code release unit 520 to one or more consumer systems, which may be known beforehand to pipeline 500 as recipients of machine learning model 170, or upon receipt of a request from those recipient's respective devices.

Feedback control unit 516 may be configured to obtain feedback to computer-generated utterances output from machine learning model 170 after machine learning model 170 was deployed. For instance, as mentioned above, feedback module 116 may obtain feedback 108 indicative audience reactions to one or more computer-generated utterances output by machine learning model 170. The feedback may be received in the form of natural text, expressive scores, n-grams, and the like.

Based on the feedback, one or more parameters of machine learning model 170 may be updated using error analysis unit 518. For example, update module 118 may identify one or more parameters of machine learning model 170 that may be adjusted, and may cause those parameters to be adjusted to reduce a rate of misclassification by machine learning model 170. In some embodiments, error analysis unit 518 may cause re-training of machine learning model to occur based on the feedback obtained by feedback control unit 516. In this particular scenario, the production environment may provide the updates, or indications of the updates to be made, to source code database 502. Then, developers may perform the updates or access the updated machine learning model for additional testing and deployment.

Figure 6:
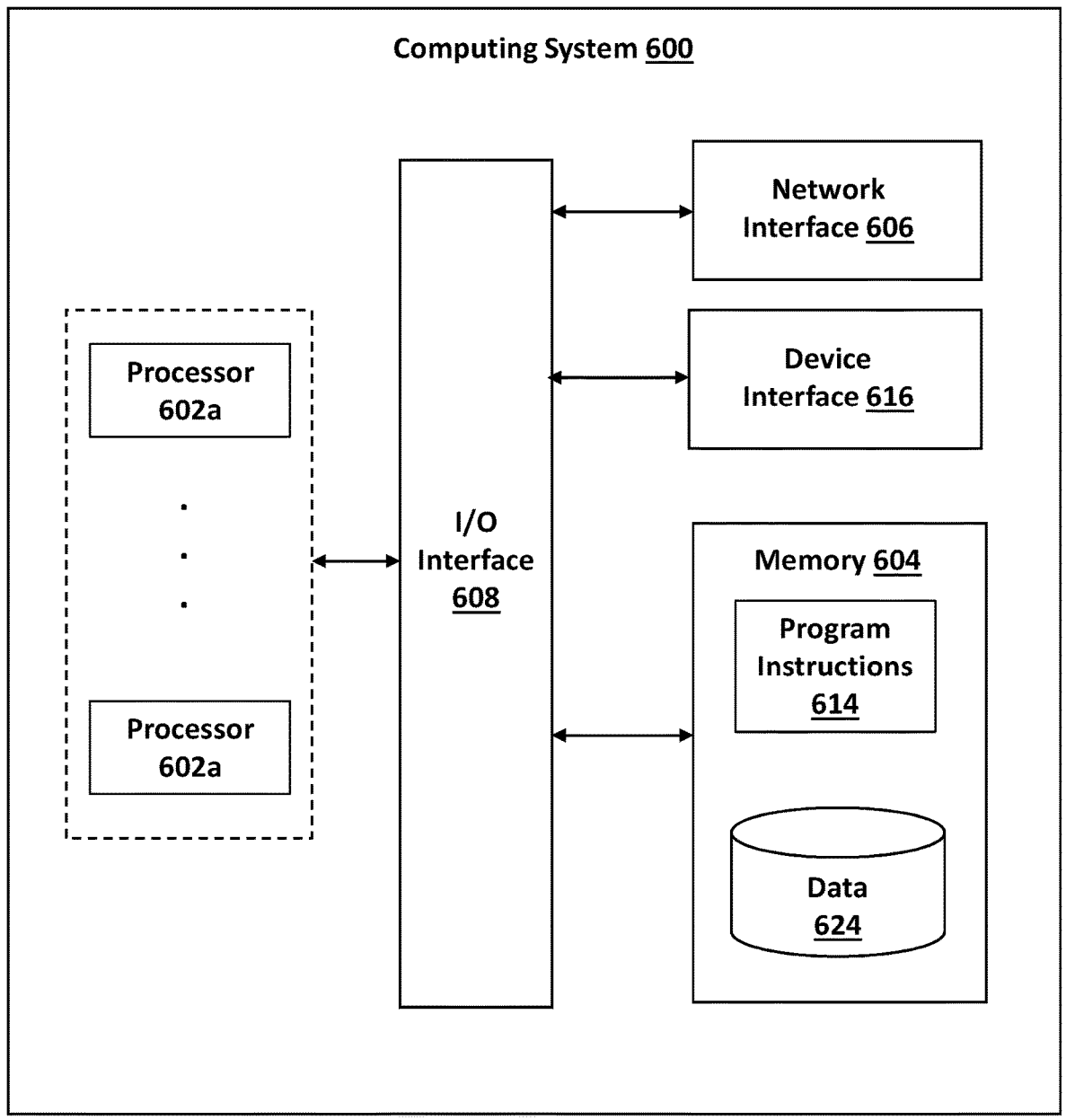
FIG. 6 is a block diagram of an example of a computing device with which the above-describe techniques may be implemented, in accordance with some embodiments of the present techniques.

FIG. 6 is an illustrative block diagram of an exemplary computing device with which the above-describe techniques may be implemented, in accordance with some embodiments of the present techniques. Various portions of systems and methods described herein, may include or be executed on one or more computer systems similar to computing system 600. Further, processes and modules described herein may be executed by one or more processing systems similar to that of computing system 600.

Computing system 600 may include one or more processors (e.g., processors 602a-602n) coupled to system memory 604, an input/output ("I/O") device interface 616, and a network interface 606 via an input/output ("I/O") interface 608. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 604). Computing system 600 may be a uni-processor system including one processor (e.g., processor 602a), or a multi-processor system including any number of suitable processors (e.g., 602a-602n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., a field programmable gate array ("FPGA") or an application specific integrated circuit ("ASIC"). Computing system 600 may include a plurality of computing devices (e.g., distributed computer systems) to implement various processing functions.

I/O device interface 616 may provide an interface for connection of one or more I/O devices to computer system 600. I/O devices may include devices that receive input (e.g., from a user) or output information (e.g., to a user). I/O devices, such as client device 150 of FIG. 1, may include, for example, graphical user interface presented on displays (e.g., a cathode ray tube ("CRT") or liquid crystal display ("LCD") monitor), pointing devices (e.g., a computer mouse or trackball), keyboards, keypads, touchpads, scanning devices, voice recognition devices, gesture recognition devices, printers, audio speakers, microphones, cameras, or the like. I/O devices may be connected to computer system 600 through a wired or wireless connection. I/O devices may be connected to computer system 600 from a remote location. I/O devices located on remote computer system, for example, may be connected to computer system 600 via a network and network interface 606.

Network interface 606 may include a network adapter that provides for connection of computer system 600 to a network. Network interface may 606 may facilitate data exchange between computer system 600 and other devices connected to the network. Network interface 606 may support wired or wireless communication. The network may include an electronic communication network, such as the Internet, a local area network ("LAN"), a wide area network ("WAN"), a cellular communications network, or the like.

System memory 604 may be configured to store program instructions 614 or data 624. Program instructions 614 may be executable by a processor (e.g., one or more of processors 602a-602n) to implement one or more embodiments of the present techniques. Instructions 614 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 604 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 604 may include a non-transitory computer readable storage medium that may have program instructions stored thereon that are executable by a computer processor (e.g., one or more of processors 602a-602n) to cause the subject matter and the functional operations described herein (e.g., processes 200, 300, or 400). A memory (e.g., system memory 604) may include a single memory device or a plurality of memory devices (e.g., distributed memory devices). Instructions or other program code to provide the functionality described herein (e.g., processes 200, 300, or 400) may be stored on a tangible, non-transitory computer readable media. In some cases, the entire set of instructions may be stored concurrently on the media, or in some cases, different parts of the instructions may be stored on the same media at different times.

I/O interface 608 may be configured to coordinate I/O traffic between processors 602a-602n, system memory 604, network interface 606, I/O devices 1060, or other peripheral devices. I/O interface 608 may perform protocol, timing, or other data transformations to convert data signals from one component (e.g., system memory 604) into a format suitable for use by another component (e.g., processors 602a-602n). I/O interface 608 may include support for devices attached through various types of peripheral buses, such as a variant of the Peripheral Component Interconnect ("PCI") bus standard or the Universal Serial Bus ("USB") standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant ("PDA"), a mobile audio or video player, a game console, a vehicle-mounted computer, or a Global Positioning System ("GPS"), or the like. Computer system 600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

This application shares a disclosure with a U.S. patent application titled "UPDATING A MACHINE LEARNING MODEL FOR IDENTIFYING OFFENSIVE LANGUAGE USING FEEDBACK TO OUTPUTS FROM THE MACHINE LEARNING MODEL," filed on the same day as this application; and a U.S. patent application titled "GENERATING TRAINING DATA FOR A MACHINE LEARNING MODEL TO IDENTIFY OFFENSIVE LANGUAGE," also filed on the same day, the disclosures of each of which are incorporated herein by reference in their entireties.

The reader should appreciate that the present application describes several independently useful techniques. Rather than separating those techniques into multiple isolated patent applications, applicants have grouped these techniques into a single document because their related subject matter lends itself to economies in the application process. Nevertheless, the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A method, comprising: obtaining, with one or more processors, a training set of n-grams labeled as offensive; causing, with one or more processors, a machine learning model to be trained based on the training set of n-grams, wherein the machine learning model, when trained, is configured to classify natural language text as offensive or non-offensive; obtaining, with one or more processors, input natural language text expressing a computer-generated utterance; classifying, with one or more processors, after causing training, the computer-generated utterance as offensive or non-offensive using the machine learning model; and causing, with one or more processors, an output to be provided to a recipient, the output being based on whether the machine learning model classifies the computer-generated utterance as offensive or non-offensive.

2. The method of embodiment 1, wherein: at least some of the n-grams in the training set comprise five or more words; each of the at least some of the n-grams in the training set have a plurality of labels indicating demographic attributes of a population for which a respective n-gram is designated as offensive; at least some of the n-grams are labeled as offensive for some populations but not other populations; each n-gram in the training set comprises natural language text obtained from a corpus of unstructured natural language text documents; the machine learning model comprises a supervised machine learning model; and the computer-generated utterance comprises an utterance generated as an output of an utterance generation engine, the utterance generation engine comprising one or more of: a chatbot, a machine translation system, a text summarization model, or a speech-to-text ("STT") processing system.

3. The method of any one of embodiments 1-2, wherein causing the machine learning model to be trained comprises: training the machine learning model based on a first sub-set of the training set of n-grams; and cross-validating the trained machine-learning model based on a second sub-set of the training set of n-grams, the second sub-set being at least partially different from the first sub-set.

4. The method of any of embodiments 1-3, wherein obtaining the training set of n-grams comprises: parsing a plurality of n-grams from a corpus of unstructured natural language text; determining an offensiveness score for each n-gram based on natural-language processing semantic analysis of responses to usage of the n-gram in the corpus, the offensiveness score indicating a likelihood that an audience reaction to the n-gram will be negative; and mapping offensiveness scores or values based on the offensiveness scores to corresponding n-grams as labels.

5. The method of any of embodiments 1-4, wherein classifying the comprises: determining, using the machine learning model, an offensiveness score for the computer-generated utterance, the offensiveness score indicating a likelihood that an audience reaction to the computer-generated utterance will be negative; determining whether the offensiveness score satisfies an offensiveness score threshold criterion, wherein: the machine learning model is configured to classify the computer-generated utterance as offensive in response to determining that the offensiveness score satisfies the offensiveness score threshold criterion, and the machine learning model is configured to classify the computer-generated utterance as non-offensive in response to determining that the offensiveness score does not satisfy the offensiveness score threshold criterion.

6. The method of any one of embodiments 1-5, further comprising: classifying the computer-generated utterance as offensive; selecting or generating, in response to classifying the computer-generated utterance as offensive, a different computer-generated utterance determined to be semantically similar to the computer-generated utterance, wherein the output is based on the different computer-generated utterance.

7. The method of any of embodiments 1-6, wherein the computer-generated utterance comprises a phrase absent from the training set of n-grams.

8. The method of any of embodiments 1-7, further comprising: determining that the machine learning model classifies the computer-generated utterance as offensive; generating a plurality of computer-generated utterances that are each determined to be semantically similar to the computer-generated utterance; determining a ranking of the plurality of computer-generated utterances according to semantic similarity; and selecting a highest ranking one of the ranking of the plurality of computer-generated utterances that is not classified as offensive by the machine learning model.

9. The method of any of embodiments 1-8, further comprising: obtaining a plurality of demographic attributes or geographic attributes of the recipient that is to be provided the computer-generated utterance, wherein: classifying the computer-generated utterance comprises classifying the computer-generated utterance as offensive is based on the plurality of demographic attributes or geographic attributes; and the machine learning model is configured to classify the computer-generated utterance differently for a different recipient having one or more different demographic attributes or geographic attributes.

10. The method of any of embodiments 1-9, wherein causing the machine learning model to be trained comprises training the machine learning model, the method further comprises:

re-training the machine learning model based on feedback from classifications by the machine learning model.

11. The method of any of embodiments 1-10, further comprising: obtaining features of each of at least some of the n-grams, the features comprising: demographic information of a provider of a response to usage of the corresponding n-gram indicative of offensiveness, and temporal metadata indicating a time that the response to usage of the corresponding n-gram indicative of offensiveness was generated, wherein: training is based on the features, and the machine learning model is configured accept the features of the recipient and classify the computer-generated utterance based on the features of the recipient.

12. The method of any of embodiments 1-11, wherein: classification of the computer-generated utterance is based on cosine angle, Minkowski distance, or Euclidean distance between a feature vector of the computer-generated utterance and a feature vector of one or more of the n-grams in the training set labeled as offensive; and the feature vector of the computer-generated utterance and the feature vector of one or more of the n-grams have dimensions corresponding to term-frequency inverse document frequency ("TFIDF") scores of different terms among the n-grams in the training set.

13. The method of any of embodiments 1-12, further comprising: developing the machine learning model; deploying the machine learning model to one or more testing systems to test functionalities of the machine learning model; and releasing the machine learning model to one or more consumer systems to be used to classify inputs as offensive or non-offensive.

14. The method of any of embodiments 1-13, wherein the machine learning model is configured to classify the computer-generated utterance as offensive based on one or more features of a recipient of the computer-generated utterance, the method further comprises: identifying one or more additional features of a different intended recipient of the computer-generated utterance; and classifying the computer-generated utterance as non-offensive based on the one or more additional features.

15. The method of any of embodiments 1-14, wherein the machine learning model comprises a software-development tool or a suite of software-development tools.

16. The method of any of embodiments 1-15, further comprising: providing the output to the machine learning model with an exogenous classification of the computer-generated utterance as offensive or non-offensive; and causing the machine learning model to be further trained based on the output and the exogenous classification.

17. A tangible, non-transitory, machine-readable medium storing instructions that when executed by one or more processors effectuate operations comprising: the operations of any of embodiments 1-16.

18. A system, comprising: one or more processors; and memory storing instructions that when executed by the processors cause the processors to effectuate operations comprising: the operations of any of embodiments 1-16.

19. A method, comprising: obtaining, with one or more processors, a corpus of unstructured natural language text statements and corresponding responses to the unstructured natural language text statements by responding users, wherein the corresponding responses are responsive natural language text statements or responding-user-expressed scores; obtaining, with one or more processors, demographic features associated with the responding users; scoring, with one or more processors, the corresponding responses based on whether the corresponding responses indicate offense to the unstructured natural language text statements to which the corresponding responses correspond in order to form offensiveness scores; forming, with one or more processors, a training set at least in part by: labeling the unstructured natural language text statements, or n-grams therein, with labels based on the offensiveness scores of corresponding responses; and associating the labels with corresponding demographic features of the responding users contributing to the offensiveness scores upon which the labels are respectively based; and causing, with one or more processors, a machine learning model to be trained based on the training set, wherein the machine learning model is configured to at least one of: classify natural language utterances as offensive or non-offensive, or generate utterances.

20. The method of embodiment 19, wherein: the corresponding responses are responsive natural language text statements; scoring, with a natural language processing sentiment analysis model, the responsive natural language text statements comprises classifying the responsive natural language text statements as indicating offense; the corpus of unstructured natural language text statements comprises conversations on a social network having metadata indicating authors and statements to which subsequent statements in the conversations are responsive; obtaining the demographic features comprises obtaining social-network profiles of authors on the social network via an application program interface of the social network in a structured-data hierarchical data serialization format; and causing the machine learning model to be trained comprises training the machine learning model by iteratively adjusting parameters of the machine learning model to reduce a rate at which the machine learning model mis-predicts the labels in the training set.

21. The method of any of embodiments 19-20, wherein labeling comprises; labeling a first subset of n-grams in a given unstructured natural language text statement as causing offense and not labeling a second subset of n-grams in the given unstructured natural language text statement as causing offense.

22. The method of any of embodiments 19-21, wherein labeling comprises: selecting the first subset of n-grams in response to a natural-language processing topic model indicating a subset of topics in the unstructured natural language text statements appear in a responsive natural language text statement of a corresponding response indicating offense.

23. The method of any of embodiments 19-22, wherein obtaining the corpus of unstructured natural language text comprises: obtaining a plurality of text strings, wherein each text string comprises one or more sub-threads of text corresponding to a response to the text string and encoding one or more of the corresponding responses by responding users.

24. The method of any of embodiments 19-23, further comprising: extracting, from each of the plurality of text strings, one or more n-grams included therein; and determining for each of the one or more n-grams of each text string, one or more additional n-grams associated with each sub-thread of text, wherein scoring comprises determining an offensiveness score associated with each text string based on the one or more additional n-grams associated with each sub-thread of text.

25. The method of any of embodiments 19-24, further comprising: determining an amount of sub-threads of text associated with each of the plurality of text strings; and determining an offensiveness score associated with each text string based, at least in part, on the amount of sub-threads of text associated with that text string.

26. The method of any of embodiments 19-25, wherein the unstructured natural language text statements are time-stamped with a timestamp, classifying comprises: determining, based on each timestamp, an amount of time between when each text string was generated and when each of the plurality of sub-threads of text associated with the corresponding text string was generated; and determining an offensiveness score associated with each text string based, at least in part, on the amount of time between when each text string was generated and when the plurality of sub-threads of text associated with the corresponding text string was generated.

27. The method of any of embodiments 19-26, wherein: he corresponding responses are responding-user-expressed scores; and responding-user-expressed scores tending to suppress one or more unstructured natural language text statements in a feed of unstructured natural language text statements are scored as indicating offense.

28. The method of any of embodiments 19-27, further comprising: determining one or more semantically related n-grams for each n-gram included within one or more of the unstructured natural language text statements that is labeled as offensive; generating classification information comprising at least one of the one or more semantically related n-grams that is classified as offensive; and generating additional entries of the training set based on the classification information.

29. The method of any of embodiments 19-28, further comprising: obtaining data output from the machine learning model, wherein the data represents one or more utterances that the machine learning model classified as offensive; extracting one or more additional features associated with each of the one or more utterances; and generating additional entries of the training set based on the data and the one or more additional features.

30. The method of any of embodiments 19-29, further comprising: expanding the training set by determining, with at least one of a word-2-vec model or latent semantic analysis ("LSA") model, that a given unstructured natural language text statement or a given n-gram therein is semantically similar to another unstructured natural language text statement or another n-gram therein; and applying a given label of the given unstructured natural language text statement or given n-gram therein to the other unstructured natural language text statement or other n-gram therein.

31. The method of any of embodiments 19-30, further comprising: obtaining an additional corpus of unstructured natural language text comprising a first plurality of n-grams; extracting one or more features associated with each of the first plurality of n-grams; and selecting a second plurality of n-grams from the first plurality of n-grams based on the extracted features, wherein each of the second plurality of n-grams are classified as one of offensive or non-offensive.

32. The method of any of embodiments 19-31, further comprising: training the machine learning model with the training set; and classifying computer-generated utterances or generating utterances with the trained machine learning model.

33. The method of any of embodiments 19-32, further comprising: developing the machine learning model; deploying the machine learning model to one or more testing systems to test functionalities of the machine learning model; and releasing the machine learning model to one or more consumer systems to be used to classify inputs as offensive or non-offensive or generate utterances.

34. The method of any of embodiments 19-33, wherein the machine learning model is part of a suite of software development tools.

35. A tangible, non-transitory, machine-readable medium storing instructions that when executed by one or more processors effectuate operations comprising: the operations of any of embodiments 19-34.

36. A system, comprising: one or more processors; and memory storing instructions that when executed by the processors cause the processors to effectuate operations comprising: the operations of any of embodiments 19-34.

37. A method, comprising: receiving, with one or more processors, a computer-generated utterance classified as non-offensive by a machine learning model, wherein the machine learning model is configured to classify input text as offensive or non-offensive; obtaining, with one or more processors, feedback regarding the computer-generated utterance, the feedback being indicative of a reaction by an audience to the computer-generated utterance; determining, with one or more processors, and based on the feedback, whether the computer-generated utterance is perceived as offensive by the audience; and causing, with one or more processors, one or more parameters of the machine learning model to be updated based on the computer-generated utterance and a result of the determination of whether the computer-generated utterance is perceived as offensive by the audience.

38. The method of embodiment 37, wherein: the computer-generated utterance is based on output of a chatbot, a machine-translation process, or a natural-language processing abstractive text summarization process; the machine learning model comprises a supervised-learning bag-of-words model trained on phrases each having a plurality of labels indicating whether the phrases were designated as offensive at different times to different respective populations having different demographic attributes; the computer-generated utterance is not among the phrases on which the supervised-learning bag-of-words model is trained; the feedback is associated with audience features among the demographic attributes; the feedback comprises unstructured natural language text from the audience following receipt of the computer-generated utterance by the audience; determining whether the computer-generated utterance is perceived as offensive by the audience comprises classifying the unstructured natural language text with a natural language processing sentiment analysis model; and causing the one or more parameters of the machine learning model to be updated comprises adjusting at least one of the one or more parameters in a direction that reduces a misclassification rate of the machine learning model on a training set that includes the computer-generated utterance and the result of the determination, wherein the rate being reduced is relative to a performance of the machine learning model prior to the at least one of the one or more parameters being updated.

39. The method of any of embodiments 37-38, wherein determining whether the computer-generated utterance is perceived as offensive comprises: determining, based on the feedback, a feedback score indicating how offensive the reaction by the audience to the computer-generated utterance was perceived to be; and determining whether the computer-generated utterance is perceived as offensive based on whether the feedback score satisfies a threshold criterion.

40. The method of any of embodiments 37-39, wherein the feedback comprises: additional text from the audience in response to receipt of the computer-generated utterance.

41. The method of any of embodiments 37-40, the method further comprises: parsing one or more n-grams from the additional text; detecting at least one term or phrase from the one or more n-grams that is included within a set of words or phrases designated as offensive; and classifying the computer-generated utterance as offensive to at least some populations in response to detecting that the one or more n-grams from the additional text include the at least one term or phrase.

42. The method of any of embodiments 37-41, wherein: the computer-generated utterance was classified by the machine learning model as being offensive at a first time to a given population; and the feedback indicates, at second time occurring temporally after the first time, the computer-generated utterance is not offensive to the given population.

43. The method of any of embodiments 37-42, further comprising: receiving an offensiveness score from the machine learning model, wherein the offensiveness score indicates how offensive the machine learning model classified the computer-generated utterance as being; and causing the machine learning model to compute a revised offensiveness score based on the feedback, the revised offensiveness score being computed subsequent to the at least one of the one or more parameters being updated.

44. The method of any of embodiments 37-43, wherein: obtaining the feedback comprises: providing the computer-generated utterance to one or more communications platforms configured to receive the feedback from one or more users; and determining a weighting of the feedback based on age of the feedback; and the updating is based on the weighting; and older feedback imparts smaller adjustments to the one or more parameters than newer feedback of otherwise identical content.

45. The method of any of embodiments 37-44, wherein: obtaining the feedback comprises determining a frequency of feedback indicating the computer-generated utterance is offensive; and determining whether the computer-generated utterance is perceived as offensive comprises: determining that the frequency exceeds an offensive language frequency threshold, and determining, in response, that the computer-generated utterance is to be classified as offensive, wherein the at least one of the one or more parameters are updated to reflect that the computer-generated utterance is classified as offensive.

46. The method of any of embodiments 37-45, wherein: the machine-learning model comprises a four-or-higher time-slice dynamic Bayesian network configured to infer whether an audience having specified demographic features will take offense to a sequence of four or more words; and updating comprises adjusting transition probabilities of a transition probability matrix having values indicative of conditional probabilities of the audience having the specified demographic features transitioning to a latent offended state conditional on the specified demographic features.

47. The method of any of embodiments 37-46, wherein: the machine-learning model comprises a recurrent neural network having long-short term memory units defining four or more cycles in a connection graph of the recurrent neural network and configured to infer whether an audience having specified demographic features will take offense to a sequence of four or more words; and updating comprises calculating a partial derivative of an objective function with respect to a weight or bias of the recurrent neural network and adjusting the weight or bias in a direction that the partial derivative indicates reduces an amount of misclassification of text as offensive or non-offensive.

48. The method of any of embodiments 37-47, wherein: the machine-learning model comprises a bag-of-words model configured to classify text as offensive or non-offensive based on distance in a feature space having dimensions corresponding to n-grams in a training set of phrases labeled as offensive or non-offensive; and updating comprises adjusting magnitudes of one or more feature vectors in the feature space by changing scalars of the feature vectors in dimensions corresponding to n-grams in the computer-generated utterance.

49. The method of any of embodiments 37-48, further comprising: receiving an additional computer-generated utterance from the machine learning model, wherein the machine learning model classified the additional computer-generated utterance as offensive; obtaining additional feedback regarding the additional computer-generated utterance; determining that the additional computer-generated utterance is perceived as non-offensive; and causing the one or more parameters to be further updated by providing the additional computer-generated utterance and the additional feedback to the machine learning model.

50. The method of any of embodiments 37-49, wherein: the machine learning model is configured to stochastically misclassify computer-generated utterances with a probability that depends, at least in part, on a score indicative of offensiveness of n-grams in misclassified computer-generated utterances and designate misclassified utterances as non-offensive after feedback fails to indicate the misclassified utterances are still offensive.

51. The method of any of embodiments 37-50, wherein the machine learning model is part of a suite of software development tools.

52. The method of any of embodiments 37-51, wherein: causing parameters of the machine learning model to be updated comprises steps for training a machine learning model.

53. A tangible, non-transitory, machine-readable medium storing instructions that when executed by one or more processors effectuate operations comprising: the operations of any of embodiments 37-52.

54. A system, comprising: one or more processors; and memory storing instructions that when executed by the processors cause the processors to effectuate operations comprising: the operations of any of embodiments 37-52.

What is claimed is:

1. A method, comprising:
obtaining, with one or more processors, a training set of n-grams labeled as offensive;
causing, with one or more processors, a machine learning model to be trained based on the training set of n-grams, wherein the machine learning model, when trained, is configured to classify natural language text as offensive or non-offensive;
obtaining, with one or more processors, input natural language text expressing a computer-generated utterance;
classifying, with one or more processors, after causing training, the computer-generated utterance as offensive or non-offensive using the machine learning model; and
causing, with one or more processors, an output to be provided to a recipient, the output being based on whether the machine learning model classifies the computer-generated utterance as offensive or non-offensive.

2. The method of claim 1, wherein:
at least some of the n-grams in the training set comprise five or more words;

each of the at least some of the n-grams in the training set have a plurality of labels indicating demographic attributes of a population for which a respective n-gram is designated as offensive;

at least some of the n-grams are labeled as offensive for some populations but not other populations;

each n-gram in the training set comprises natural language text obtained from a corpus of unstructured natural language text documents;

the machine learning model comprises a supervised machine learning model; and the computer-generated utterance comprises an utterance generated as an output of an utterance generation engine, the utterance generation engine comprising one or more of: a chatbot, a machine translation system, a text summarization model, or a speech-to-text ("STT") processing system.

3. The method of claim 1, wherein causing the machine learning model to be trained comprises:

training the machine learning model based on a first sub-set of the training set of n-grams; and cross-validating the trained machine-learning model based on a second sub-set of the training set of n-grams, the second sub-set being at least partially different from the first sub-set.

4. The method of claim 1, wherein obtaining the training set of n-grams comprises:

parsing a plurality of n-grams from a corpus of unstructured natural language text;

determining an offensiveness score for each n-gram based on natural-language processing semantic analysis of responses to usage of the n-gram in the corpus, the offensiveness score indicating a likelihood that an audience reaction to the n-gram will be negative; and mapping offensiveness scores or values based on the offensiveness scores to corresponding n-grams as labels.

5. The method of claim 1, wherein classifying the comprises:

determining, using the machine learning model, an offensiveness score for the computer-generated utterance, the offensiveness score indicating a likelihood that an audience reaction to the computer-generated utterance will be negative;

determining whether the offensiveness score satisfies an offensiveness score threshold criterion, wherein:

the machine learning model is configured to classify the computer-generated utterance as offensive in response to determining that the offensiveness score satisfies the offensiveness score threshold criterion, and the machine learning model is configured to classify the computer-generated utterance as non-offensive in response to determining that the offensiveness score does not satisfy the offensiveness score threshold criterion.

6. The method of claim 1, further comprising:

classifying the computer-generated utterance as offensive;

selecting or generating, in response to classifying the computer-generated utterance as offensive, a different computer-generated utterance determined to be semantically similar to the computer-generated utterance, wherein the output is based on the different computer-generated utterance.

7. The method of claim 1, wherein the computer-generated utterance comprises a phrase absent from the training set of n-grams.

8. The method of claim 1, further comprising:

determining that the machine learning model classifies the computer-generated utterance as offensive;

generating a plurality of computer-generated utterances that are each determined to be semantically similar to the computer-generated utterance;

determining a ranking of the plurality of computer-generated utterances according to semantic similarity; and selecting a highest ranking one of the ranking of the plurality of computer-generated utterances that is not classified as offensive by the machine learning model.

9. The method of claim 1, further comprising:

obtaining a plurality of demographic attributes or geographic attributes of the recipient that is to be provided the computer-generated utterance, wherein:

classifying the computer-generated utterance comprises classifying the computer-generated utterance as offensive is based on the plurality of demographic attributes or geographic attributes; and the machine learning model is configured to classify the computer-generated utterance differently for a different recipient having one or more different demographic attributes or geographic attributes.

10. The method of claim 1, wherein causing the machine learning model to be trained comprises training the machine learning model, the method further comprises:

re-training the machine learning model based on feedback from classifications by the machine learning model.

11. The method of claim 1, further comprising:

obtaining features of each of at least some of the n-grams, the features comprising: demographic information of a provider of a response to usage of the corresponding n-gram indicative of offensiveness, and temporal metadata indicating a time that the response to usage of the corresponding n-gram indicative of offensiveness was generated, wherein:

training is based on the features, and the machine learning model is configured accept the features of the recipient and classify the computer-generated utterance based on the features of the recipient.

12. The method of claim 1, wherein:

classification of the computer-generated utterance is based on cosine angle, Minkowski distance, or Euclidean distance between a feature vector of the computer-generated utterance and a feature vector of one or more of the n-grams in the training set labeled as offensive; and the feature vector of the computer-generated utterance and the feature vector of one or more of the n-grams have dimensions corresponding to term-frequency inverse document frequency ("TFIDF") scores of different terms among the n-grams in the training set.

13. The method of claim 1, further comprising:

developing the machine learning model;

deploying the machine learning model to one or more testing systems to test functionalities of the machine learning model; and releasing the machine learning model to one or more consumer systems to be used to classify inputs as offensive or non-offensive.

14. The method of claim 1, wherein the machine learning model is configured to classify the computer-generated utterance as offensive based on one or more features of a recipient of the computer-generated utterance, the method further comprises:

identifying one or more additional features of a different intended recipient of the computer-generated utterance; and classifying the computer-generated utterance as non-offensive based on the one or more additional features.

15. The method of claim 1, wherein the machine learning model comprises a software-development tool or a suite of software-development tools.

16. The method of claim 1, further comprising:

providing the output to the machine learning model with an exogenous classification of the computer-generated utterance as offensive or non-offensive; and causing the machine learning model to be further trained based on the output and the exogenous classification.

17. A tangible, non-transitory, machine-readable medium storing instructions that when executed by one or more processors effectuate operations comprising:

obtaining, with one or more processors, a training set of n-grams labeled as offensive;

causing, with one or more processors, a machine learning model to be trained based on the training set of n-grams, wherein the machine learning model, when trained, is configured to classify natural language text as offensive or non-offensive;

obtaining, with one or more processors, input natural language text expressing a computer-generated utterance;

classifying, with one or more processors, after causing training, the computer-generated utterance as offensive or non-offensive using the machine learning model; and causing, with one or more processors, an output to be provided to a recipient, the output being based on whether the machine learning model classifies the computer-generated utterance as offensive or non-offensive.

18. The medium of claim 17, wherein obtaining the training set of n-grams comprises:

parsing a plurality of n-grams from a corpus of unstructured natural language text;

determining an offensiveness score for each n-gram based on natural-language processing semantic analysis of responses to usage of the n-gram in the corpus, the offensiveness score indicating a likelihood that an audience reaction to the n-gram will be negative; and mapping offensiveness scores or values based on the offensiveness scores to corresponding n-grams as labels.

19. The medium of claim 17, wherein the instructions when executed by one or more processors further effectuate operations comprising:

determining that the machine learning model classifies the computer-generated utterance as offensive;

generating a plurality of computer-generated utterances that are each determined to be semantically similar to the computer-generated utterance;

determining a ranking of the plurality of computer-generated utterances according to semantic similarity; and selecting a highest ranking one of the ranking of the plurality of computer-generated utterances that is not classified as offensive by the machine learning model.

20. The medium of claim 17, wherein the instructions when executed by one or more processors further effectuate operations comprising:

obtaining a plurality of demographic attributes or geographic attributes of the recipient that is to be provided the computer-generated utterance, wherein:

classifying the computer-generated utterance comprises classifying the computer-generated utterance as offensive is based on the plurality of demographic attributes or geographic attributes; and the machine learning model is configured to classify the computer-generated utterance differently for a different recipient having one or more different demographic attributes or geographic attributes.

* * * * *